(12) United States Patent
Tanijiri et al.

(10) Patent No.: US 7,835,050 B2
(45) Date of Patent: Nov. 16, 2010

(54) OPTICAL HOLOGRAPHIC DEVICE WITH A HOLOGRAM OPTICAL ELEMENT ON AN AREA SMALLER THAN AN IRRADIATION AREA, HOLOGRAPHIC IMAGE DISPLAY DEVICE AND HEAD MOUNTED DISPLAY WITH A HOLOGRAM OPTICAL ELEMENT ON AN AREA SMALLER THAN AN IRRADIATION AREA

(75) Inventors: Yasushi Tanijiri, Osakasayama (JP); Yoshie Shimizu, Ibaraki (JP); Tetsuya Noda, Tenri (JP); Ichiro Kasai, Toyonaka (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 52 days.

(21) Appl. No.: 11/492,132

(22) Filed: Jul. 24, 2006

(65) Prior Publication Data
US 2007/0019264 A1   Jan. 25, 2007

(30) Foreign Application Priority Data
Jul. 25, 2005 (JP) .............................. 2005-213823

(51) Int. Cl.
*G03H 1/00* (2006.01)
(52) U.S. Cl. .......................................... 359/13; 359/2
(58) Field of Classification Search .................. 359/7, 359/9, 13, 15, 16, 630, 631, 834, 2; 345/7, 345/9; 283/86
See application file for complete search history.

(56) References Cited

U.S. PATENT DOCUMENTS

| | | | | |
|---|---|---|---|---|
| 4,099,841 A | * | 7/1978 | Ellis ............................ | 359/630 |
| 4,269,473 A | * | 5/1981 | Flothmann et al. ............. | 359/2 |
| 5,790,284 A | * | 8/1998 | Taniguchi et al. ............. | 359/15 |
| 5,864,375 A | * | 1/1999 | Taketomi et al. .............. | 349/15 |
| 6,956,963 B2 | * | 10/2005 | Ulrich et al. ................ | 382/154 |

(Continued)

FOREIGN PATENT DOCUMENTS

JP        1-163742 A        6/1989

(Continued)

OTHER PUBLICATIONS

Japanese "Notice of Grounds for Rejection," dated Jan. 5, 2010, for counterpart Japanese Patent Application No. 2005-213823, together with an English-language translation thereof.

(Continued)

*Primary Examiner*—Stephone B Allen
*Assistant Examiner*—Jennifer L. Doak
(74) *Attorney, Agent, or Firm*—Sidley Austin LLP

(57) ABSTRACT

A hologram optical element is formed on a substrate so as to make an optical device. The hologram optical element is formed in an area smaller than an irradiation area of a beam for reproduction such as image light or object light on the substrate. Supposing that the beam for reproduction is made of a center beam having intensity higher than 50% of center intensity and other peripheral beam, the hologram optical element is formed on the substrate in a size for diffracting only the center beam so that a flare or a ghost can be relieved without using additional optical elements such as a shading plate.

11 Claims, 24 Drawing Sheets

U.S. PATENT DOCUMENTS

| | | | |
|---|---|---|---|
| 2002/0039232 A1 | 4/2002 | Takeyama | 359/566 |
| 2002/0118409 A1* | 8/2002 | Stevenson | 359/2 |
| 2004/0141217 A1* | 7/2004 | Endo et al. | 359/13 |

FOREIGN PATENT DOCUMENTS

| | | |
|---|---|---|
| JP | 3-167588 A | 7/1991 |
| JP | 6-342128 A | 12/1994 |
| JP | 9-65245 A | 3/1997 |
| JP | 2002-139695 A | 5/2002 |
| JP | 2004-271651 A | 9/2004 |

OTHER PUBLICATIONS

Japanese Official Communication dated Jun. 8, 2010, for the corresponding Japanese Patent Application No. 2005-213823, together with an English-language translation thereof.

English translation of Japanese Decision of Rejection dated Sep. 7, 2010, for counterpart Japanese Application No. 2005-213823.

* cited by examiner

FIG.25A
FIG.25B
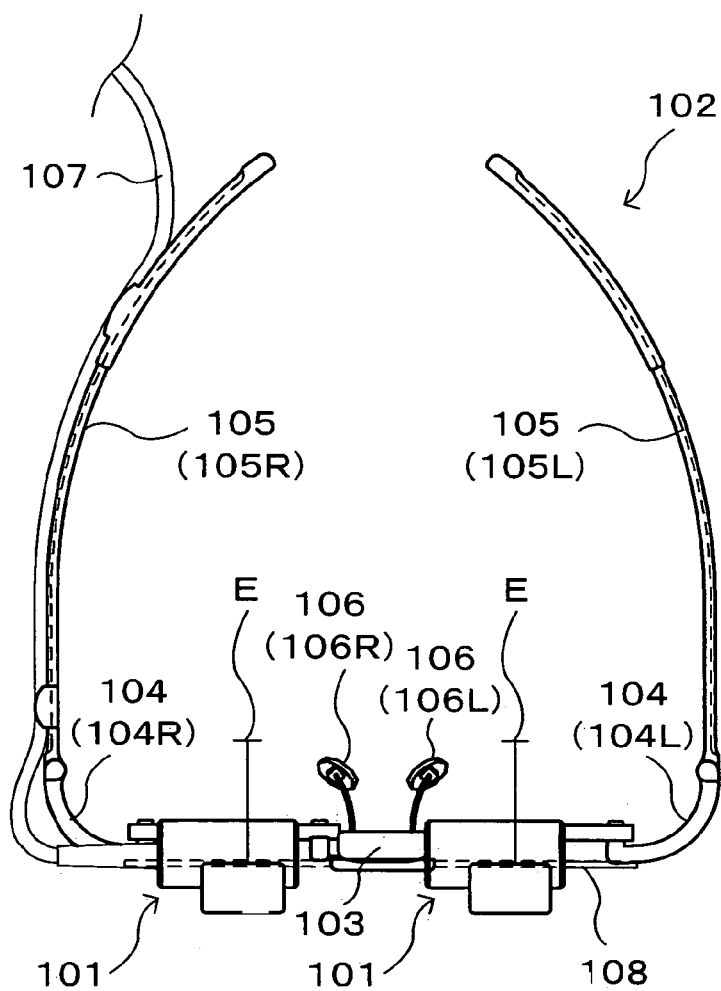
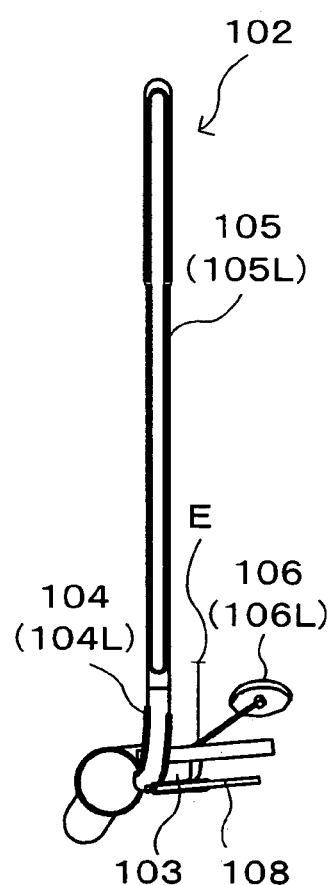
FIG.25C
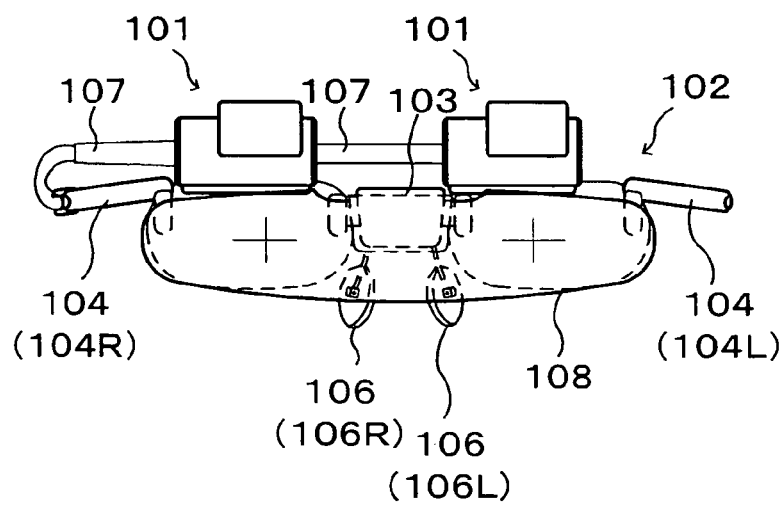

OPTICAL HOLOGRAPHIC DEVICE WITH A HOLOGRAM OPTICAL ELEMENT ON AN AREA SMALLER THAN AN IRRADIATION AREA, HOLOGRAPHIC IMAGE DISPLAY DEVICE AND HEAD MOUNTED DISPLAY WITH A HOLOGRAM OPTICAL ELEMENT ON AN AREA SMALLER THAN AN IRRADIATION AREA

This application is based on Japanese Patent Application No. 2005-213823 filed on Jul. 25, 2005, the entire contents of which are hereby incorporated by reference.

BACKGROUND OF THE INVENTION

1. Field of the Invention

The present invention relates to an optical device including a volume phase type hologram optical element formed on a substrate, an image display device that utilizes the optical device and a head mounted display (hereinafter also referred to as an HMD) equipped with the image display device.

2. Description of Related Art

Conventionally, there are proposed various types of image display devices that conducts image light from a display element (e.g., a liquid crystal display element) to the observer's pupil (of the eye) via an ocular optical system. In this image display device, the image light or external light may propagate through an optical path other than a regular optical path inside the ocular optical system and reach the observer's pupil as flare light or ghost light. In this case, quality of the image (a picture or an external image) to be observed by the observer may be deteriorated.

Therefore, a device described in Patent Document 1, listed below, uses a shading plate disposed between the ocular optical system made up of an eccentric prism and the observer's pupil so that the flare light or the ghost light is shaded by the shading plate. Thus, the quality deterioration of the image observed by the observer is avoided.

The patent document mentioned above is as follows:

Patent Document 1: JP-A-9-65245

It is supposed that image light from the display element is composed of a center beam having high light intensity and a peripheral beam having low light intensity. Then, it can be said that the center beam has high optical performance because it has little aberration in the optical system of the image display device. On the contrary, the peripheral beam cannot be said to have high optical performance because it has much aberration in the optical system. Therefore, it is considered that if the shading plate such as described in Patent Document 1 is provided to the ocular optical system on the observer side so that only the peripheral beam of the image light from the display element can be blocked, a high quality image formed only by the beam having high optical performance would be provided to the observer.

In this case, however, the necessity of the shading plate that is an optical element disposed just in front of the eye of the observer would cause an increase in size of the device due to an increase of the thickness thereof, resulting in an increase of cost of the device. In addition, if the ocular optical system is used as a combiner of image light and external light, a field of view for the observer to observe an external image would be blocked partially by the shading plate. As a result, a range for the observer to observe the external image would be narrowed.

SUMMARY OF THE INVENTION

An object of the present invention is to provide an optical device, an image display device utilizing the optical device and a head mounted display equipped with the image display device, in which a high quality image can be provided to an observer with a compact and inexpensive device, and a wide field of view for the observer to observe an external image is secured even if an ocular optical system is used as a combiner of image light and external light.

According to an aspect of the present invention, an optical device includes a substrate and a volume phase type hologram optical element formed on the substrate for diffracting and reflecting incident light. The hologram optical element is formed in an area that is smaller than an irradiation area on the substrate that is irradiated with light.

According to the present invention, since the hologram optical element of the optical device is formed in the area smaller than the irradiation area of the beam (e.g., image light from the display element or light from an imaging target) on the substrate, it is possible to diffract only the center beam having high optical performance with little aberration of the beam by the hologram optical element without diffracting the peripheral beam having a bad optical performance with much aberration by the hologram optical element. Thus, if the optical device is used for an image display device for example, the observer can observe a high quality image formed by the beam having high optical performance. Furthermore, if the optical device is used for an imaging device for example, an imaging sensor can obtain an object image with high image quality formed by the beam having high optical performance.

In addition, the structure of the present invention prevents undesired light from being conducted to the observer's pupil by restricting a forming area of the hologram optical element without using a conventional shading plate disposed in front of the observer's eye. Therefore, even in the case where the optical device of the present invention is used for the ocular optical system (as a combiner between image light and external light) of the image display device for example, a wide field of view for the observer to observe an external image can be secured. In addition, since the conventional shading plate is needless, downsizing (particularly a low profile) and cost reduction of the image display device and therefore the head mounted display can be realized.

In addition, the image display device of the present invention includes a display element for displaying an image, and an ocular optical system for conducting image light from the display element to the observer's pupil. The ocular optical system includes the optical device of the present invention described above. In addition, the image display device of the present invention includes a display element for displaying a predetermined image, a substrate disposed at a position where an image light beam from the display element reaches, and a volume phase type hologram optical element formed on the substrate for diffracting and reflecting incident light. The hologram optical element is formed in an area that is smaller than an irradiation area of the image light beam from the display element on the substrate.

In this way, since the image display device is made up of the optical device according to the present invention, the observer can observe a high quality image formed by the beam having high optical performance. In addition, since it is not necessary to dispose the conventional shading plate in front of the observer's eye, a wide field of view for the observer to observe an external image can be secured. Moreover, downsizing and cost reduction of the device can be realized.

In addition, the head mounted display of the present invention includes the above-mentioned image display device and a support portion for supporting the above-mentioned image display device. According to this structure, since the image display device is supported by the support portion, the observer can observe an image provided from the image display device in a hands-free manner.

BRIEF DESCRIPTION OF THE DRAWINGS

The above-mentioned and other objects and features of the present invention will be clearer from the following description about preferred examples with reference to the attached drawings.

FIG. 25A a plan view showing a general structure of another head mounted display.

FIG. 25B is a side view of the head mounted display.

FIG. 25C is a front view of the head mounted display.

DESCRIPTION OF THE PREFERRED EMBODIMENTS

First Embodiment

An embodiment of the present invention will be described as follows with reference to the attached drawings.

(1-1. Structure of an Image Display Device)

Figure 2:
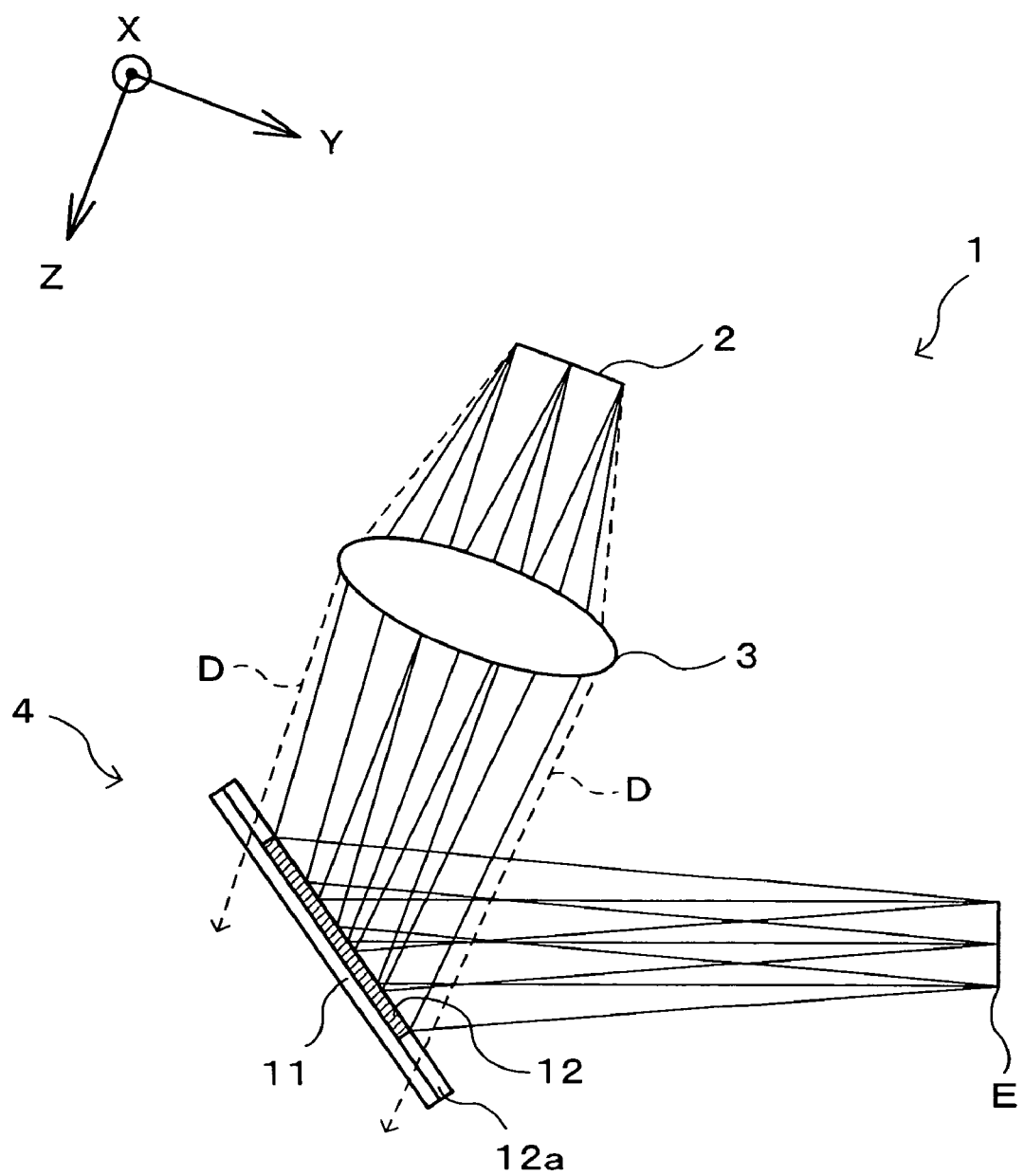
FIG. 2 is a cross section showing a general structure of the image display device.

FIG. 2 is a cross section showing a general structure of the image display device 1 according to this embodiment. This image display device 1 includes a display element 2, an ocular lens 3 and an optical device 4.

For convenience of description hereinafter, some directions are defined as follows. First, an optical axis is defined as an axis line connecting optically a center of a display area on the display element 2 with a center of an optical pupil E formed by the optical device 4. Then, a Z-direction is defined as a direction of the optical axis of an optical path from the display element 2 to the optical pupil E when it is developed. In addition, an X-direction is defined as a direction perpendicular to an incidence plane of the optical axis to a hologram optical element 12 of the optical device 4 that will be described below, and a Y-direction is defined as a direction perpendicular to a ZX plane. Note that the incidence plane of the optical axis to the hologram optical element 12 means a plane including the optical axis of the incident light and the optical axis of reflected light in the hologram optical element 12, that is, a YZ plane. Hereinafter, the above-mentioned incidence plane will be referred to as an incidence plane simply or as an optical axis incidence plane. Note that the above-mentioned definitions of directions will be applied to other drawings, too.

The display element 2 is made up of a transmission type liquid crystal display element (LCD) equipped with a light source such as a backlight, for example, for displaying images. Note that the display element 2 may be made up of other light modulation element such as a reflection type liquid crystal display element, an EL (electroluminescence) display element or a DMD (digital micro mirror device manufactured by Texas Instruments, Inc. in U.S.A.). The ocular lens 3 has a positive optical power, so it conducts image light from the display element 2 to the optical device 4. The optical device 4 constitutes an ocular optical system for conducting image light from the display element 2 obtained through the ocular lens 3 to an observer's pupil (of the eye).

The optical device 4 is made up of a volume phase type hologram optical element 12 formed on a substrate 11. The substrate 11 is a transparent plate, for example, but it may be a relatively thin film such as a cover film. The hologram optical element 12 does not have an optical power in this embodiment, and it is manufactured by applying a hologram photosensitive material 12a on the substrate 11 and irradiating two beams onto the hologram photosensitive material 12a so that interference fringes are recorded on the hologram photosensitive material 12a. Further details about the method for manufacturing the hologram optical element 12 will be described later.

According to the structure described above, the image light from the display element 2 is made a virtual image by the ocular lens 3 and is diffracted by the hologram optical element 12 of the optical device 4, and then it is conducted to the optical pupil E. If the observer's pupil is arranged at the position of the optical pupil E, the observer can observe the image of the optical pupil E.

It is desirable that an antireflection coating is formed on the surfaces of the substrate 11 and the hologram photosensitive material 12a (including the hologram optical element 12). In this case, since reflection of light on the front or the rear side thereof is suppressed, a flare or a ghost due to such reflection of light can be relieved.

(1-2. Forming Area of the Hologram Optical Element)

Next, an area in which the hologram optical element 12 is formed on the substrate 11 will be described.

Figure 1:
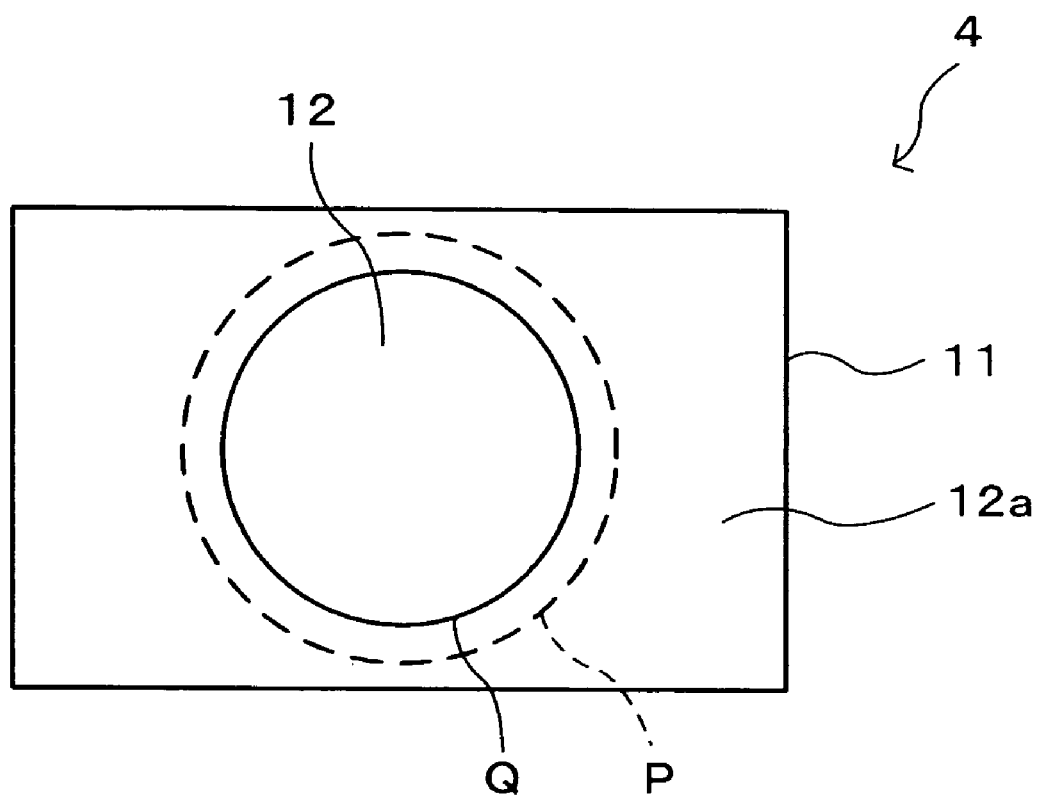
FIG. 1 is a plan view showing schematically an area in which a hologram optical element is formed on a substrate of an optical device that is used in an image display device according to an embodiment of the present invention.

FIG. 1 is a plan view showing schematically an area in which a hologram optical element 12 is formed on a substrate 11. In this embodiment, the hologram optical element 12 is formed in an area Q that is smaller than an irradiation area P on the substrate 11 that is irradiated with a beam for reproduction, i.e., image light from the display element 2 (hereinafter also referred to as reproducing light). More specific description is as follows.

Figure 3:
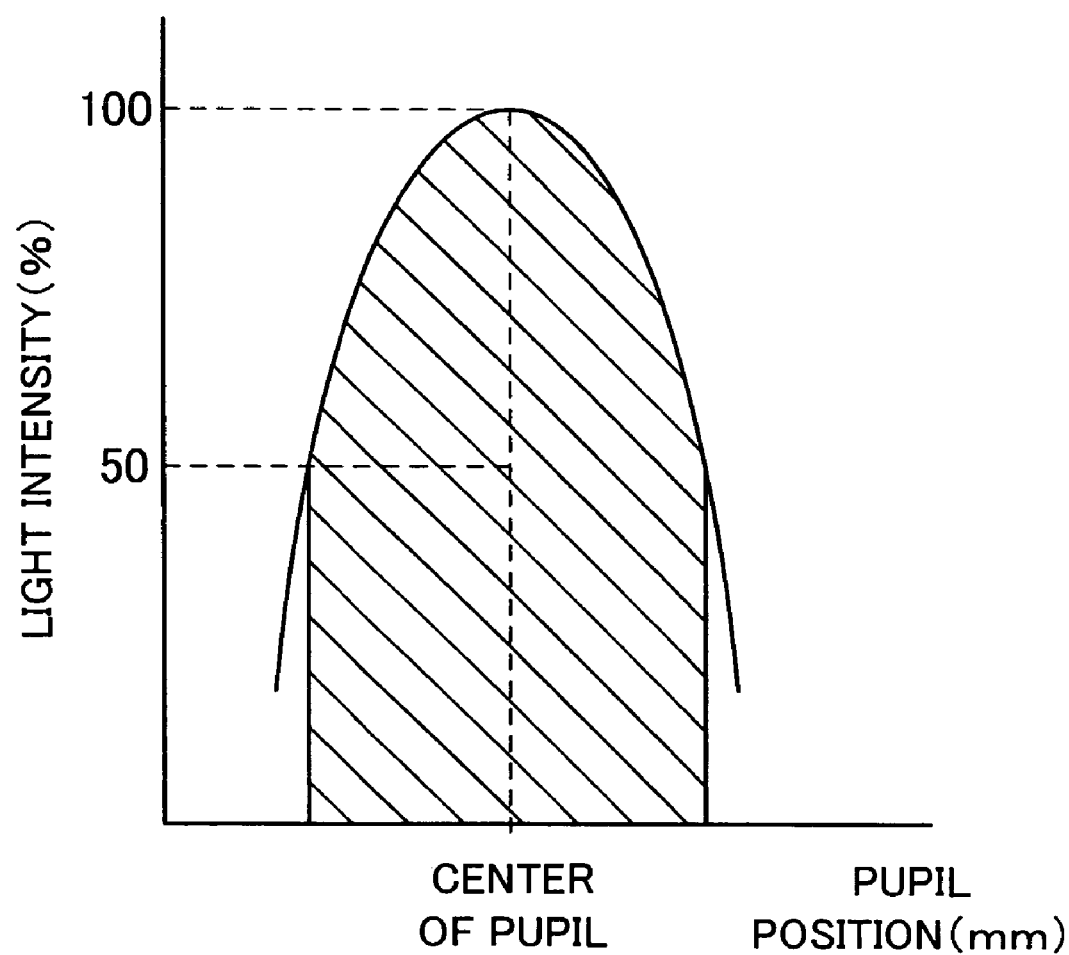
FIG. 3 is a graph showing a relationship between a pupil position and light intensity of reproducing light.

FIG. 3 shows a relationship between a pupil position and light intensity of the reproducing light. Supposing that the reproducing light is composed of a center beam having intensity higher than or equal to 50% of a center intensity and other peripheral beam (outer beam of the center beam, which has intensity less than 50% of the center intensity), the hologram optical element 12 is formed on the substrate 11 within an area for diffracting only the center beam. More specifically, a size of the hologram optical element 12 for diffracting only the center beam corresponds to the area Q shown in FIG. 1.

Note that the hologram optical element 12 is, as described above, a part of the hologram photosensitive material 12a applied on the substrate 11 where the interference fringes are recorded by the irradiation of the two beams for manufacture, so a part other than the part where the hologram optical element 12 is formed in the hologram photosensitive material 12a is remained as the raw hologram photosensitive material 12a.

Since the hologram optical element 12 is formed on the substrate 11 as described above, when the reproducing light irradiates the optical device 4, the peripheral beam of the reproducing light irradiates the outside of the area Q that is a forming area of the hologram optical element 12. Therefore, the peripheral beam is not diffracted by the hologram optical element 12 and passes through the optical device 4 as shown by a broken line D in FIG. 2. On the contrary, the center beam of the reproducing light is diffracted by the hologram optical element 12 and is conducted to the optical pupil E. Since the center beam has little aberration in the optical system and has a high optical performance, the observer can observe a high quality image formed by the beam having a high optical performance. In addition, since undesired diffraction of the peripheral beam does not occur in the hologram optical element 12, a flare or a ghost due to the peripheral beam can be relieved.

In addition, even if the forming area of the hologram optical element 12 is restricted as described above, it is avoided that brightness of the observed image is decreased excessively because the image is displayed (provided) by utilizing the center beam of the reproducing light having light intensity more than or equal to 50% of the center intensity.

In addition, since the forming area of the hologram optical element 12 is defined as described in this embodiment, undesired light is not directed to the observer's pupil. In other words, the undesired light is not diffracted by the hologram optical element 12. Therefore, it is not required to dispose a shading plate in front of the observer's eye unlike the conventional structure, so that downsizing (in particular a low profile) and cost reduction of the image display device 1 can be realized.

In addition, a size of the beam is restricted at the position near the optical pupil E and in the state of the beam for reproduction being substantially a collimated beam. Therefore, sizes of the beams restricted by a height of the image becomes substantially the same, and not only the center but also the periphery of the optical pupil E is so bright that a high quality image can be observed.

(1-3. Method for Manufacturing the Hologram Optical Element)

Figure 4:
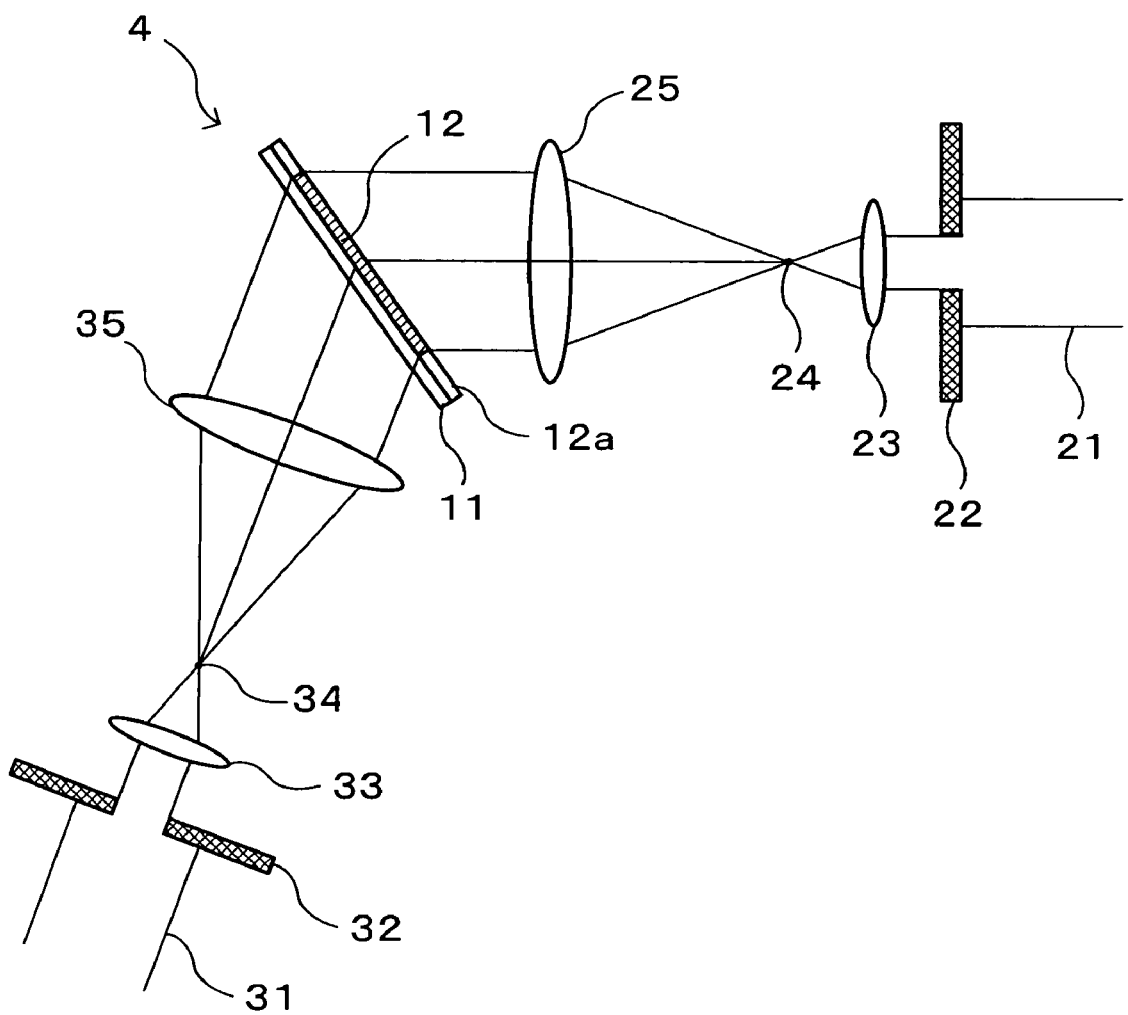
FIG. 4 is a cross section showing a general structure of an optical system that is used for manufacturing the hologram optical element.

Next, a method for manufacturing the hologram optical element 12 will be described. FIG. 4 is a cross section showing a general structure of an optical system that is used for manufacturing the hologram optical element 12.

First, a hologram photosensitive material 12a is applied on the substrate 11. It is supposed that the hologram photosensitive material 12a is applied on the substrate 11 in an area that is larger than the irradiation areas of the two beams that are used for manufacturing the hologram optical element 12 (hereinafter also referred to as two beams for manufacture). Then, the substrate 11 on which the hologram photosensitive material 12a is applied is disposed at a predetermined position in the optical system as shown in FIG. 4.

In the optical system described above, a laser beam from a light source (not shown) is divided into two collimated beams, i.e., laser beams 21 and 31. These laser beams 21 and 31 correspond to the two beams for manufacture mentioned above.

The laser beam 21 is restricted by a diaphragm 22 to have a smaller diameter, and is converted into a point light source 24 by an objective lens 23. After that, it is converted into a collimated beam by a lens 25 and irradiates the front side of the hologram photosensitive material 12a (the opposite side to the substrate 11) on the substrate 11. Note that the irradiation area of the laser beam 21 on the hologram photosensitive material 12a is smaller than the area in which the hologram photosensitive material 12a is applied on the substrate 11 (the entire of the substrate 11), and more specifically it is the same as the area Q shown in FIG. 1.

The other laser beam 31 is restricted by a diaphragm 32 to have a smaller diameter, and is converted into a point light source 34 by an objective lens 33. After that, it is converted into a collimated beam by a lens 35 and irradiates the back side of the hologram photosensitive material 12a (the same side as the substrate 11) on the substrate 11. Note that the irradiation area of the laser beam 31 on the hologram photosensitive material 12a is also smaller than an applied area of the hologram photosensitive material 12a on the substrate 11, and more specifically it is the same as the area Q shown in FIG. 1.

When these two beams are irradiated, the interference fringes are recorded on the overlapping area of the irradiation areas of the two beams on the hologram photosensitive material 12a so that the hologram optical element 12 is manufactured. After that, the optical device 4 is completed by a baking process and a fixing process.

In this embodiment, the hologram photosensitive material 12a is applied on the substrate 11 in an area larger than the irradiation areas of the two beams for manufacture. Therefore, it can be said that the hologram optical element 12 is manufactured by irradiating two beams so that the irradiation areas overlap each other on a part of the hologram photosensitive material 12a applied on the substrate 11, for recording interference fringes on the overlapped part of the irradiation areas of the two beams on the hologram photosensitive material 12a.

In the optical system described above, sizes of the diaphragms 22 and 32 are controlled so that the laser beams having the same size (the same beam diameter) irradiates the hologram photosensitive material 12a for recording the interference fringes only in a required area. In addition, since the two laser beams interfere with each other in the same area on the hologram photosensitive material 12a, interference due to one of the laser beams hardly occur. Thus, undesired interference fringes are not recorded, and a ghost or a flare can be relieved.

In addition, the two beams that are used for manufacture, that are two beams irradiated on the hologram photosensitive material 12a are formed by controlling angles of divergence of light emitted from the corresponding point light sources 24 and 34 by the diaphragms 22 and 32. Therefore, the irradiation areas of the two beams on the substrate 11 can be controlled easily and securely at a low cost, so that a size of the hologram optical element 12 on the substrate 11 (the forming area) can be controlled easily and securely at a low cost.

Although the diameters of the laser beams 21 and 31 are restricted by the diaphragms 22 and 32 so that the irradiation areas of the laser beams 21 and 31 on the hologram photosensitive material 12a becomes the same area Q in this embodiment, it is permissible that the irradiation areas of the two beams are not the same completely as long as the irradiation areas of the laser beams 21 and 31 on the hologram photosensitive material 12a have the overlapping area.

Figure 5:
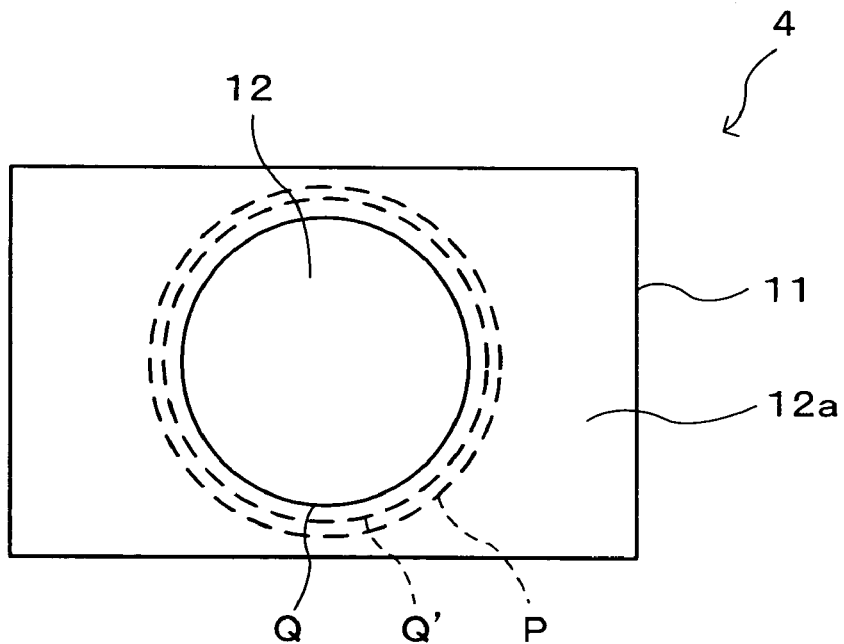
FIG. 5 is a plan view showing schematically the area in which the hologram optical element is formed on the substrate in the case where irradiation areas of two beams for manufacture are different from each other.

For example, FIG. 5 is a plan view showing schematically the forming area of the hologram optical element 12 on the substrate 11 in the case where the irradiation areas (sizes) of the two beams for manufacture are different from each other. The irradiation areas of the laser beams 21 and 31 on the hologram photosensitive material 12a may be formed so that one of the irradiation areas (area Q) is included in the other irradiation area (area Q').

In this case too, the overlapping part of the irradiation areas of the two beams for manufacture on the hologram photosensitive material 12a becomes the area Q, so that the hologram optical element 12 is formed at the size diffracting only the center beam of the reproducing light. In this case too, therefore, the observer can observe a high quality image formed by the beam having a high optical performance.

In this case, if a part where only one of the two beams for manufacture is irradiated on the hologram photosensitive material 12a (corresponding to the area Q' minus the area Q in FIG. 5) remains, this part may diffract the reproducing light, and the diffracted light may reach the observer's pupil as flare light or ghost light resulting in deterioration of quality of the observed image. In order to avoid such deterioration, it is desirable that a part of the hologram photosensitive material 12a except for the overlapping part of the irradiation areas of the two beams for manufacture (the area Q) is removed.

Figure 6:
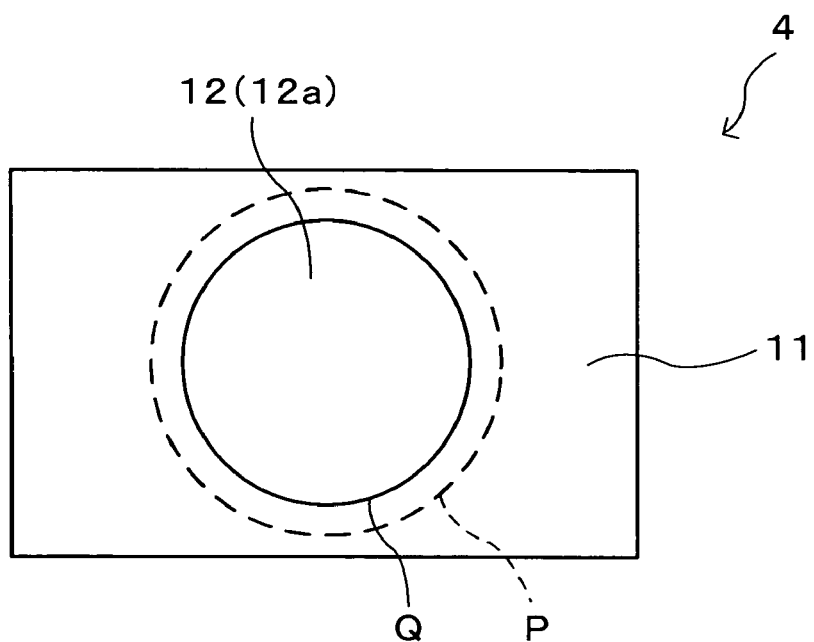
FIG. 6 is a plan view showing schematically the hologram optical element that is formed by applying a hologram photosensitive material to only an overlapping part of the irradiation areas of the two beams for manufacture on the substrate.

In addition, as shown in FIG. 6, it is permissible that the hologram photosensitive material 12a is applied on the substrate 11 only in the area of the overlapping part of the irradiation areas of the two beams for manufacture (i.e., the area Q). In this case, even if the diameters of the two beams for manufacture are different from each other, the two beams for manufacture have substantially the same size on the hologram photosensitive material 12a. Therefore, the hologram optical element 12 can be formed on the substrate 11 only in the required area regardless of the sizes (or diameters) of the irradiation areas of the two beams for manufacture on the substrate 11. Accordingly, when the diaphragms 22 and 32 are controlled, it is not necessary to make irradiation areas (or diameters) of the two beams for manufacture match with each other or make them match with the forming area of the hologram optical element 12.

Note that the method for manufacturing the hologram optical element 12 described above (concerning the step of making the irradiation areas of the two beams for manufacture differ from each other, the step of removing the hologram photosensitive material 12a of a part except for the overlapping part of the irradiation areas in this case, and the step of applying the hologram photosensitive material 12a on the substrate 11 only in the overlapping part of the irradiation areas) can be applied to other embodiments that will be described later.

(1-4. Application Example of the Optical Device)

Next, various application examples will be described about the optical device 4 including the hologram optical element 12 formed on the substrate 11 at the size for diffracting only the center beam of the reproducing light.

Figure 7:
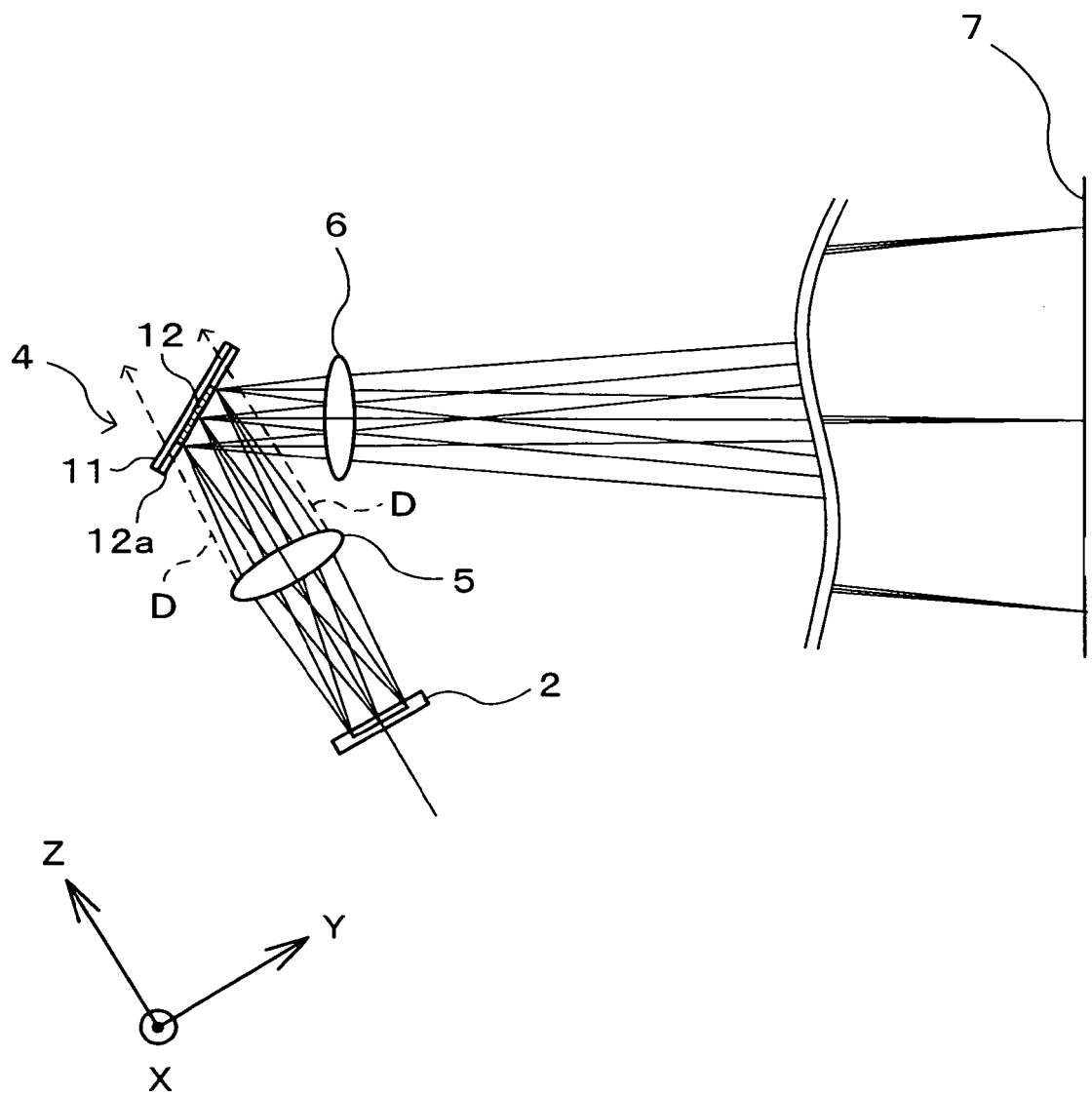
FIG. 7 is a cross section showing a general structure of a real image projection type image display device utilizing the optical device.

FIG. 7 is a cross section showing a general structure of a real image projection type image display device utilizing the optical device 4. This device includes the display element 2, the optical device 4, projection lenses 5 and 6 and a screen 7.

The center beam of the image light (reproducing light) from the display element 2 enters the optical device 4 via the projection lens 5, is diffracted by the hologram optical element 12, and is projected onto the screen 7 via the projection lens 6. On the contrary, the peripheral beam of the image light (the beam shown by the broken line D in FIG. 7) passes through the substrate 11 since it does not enter the hologram optical element 12 although it enters the optical device 4 via the projection lens 5. Therefore, a high quality image formed only by the center beam can be displayed on the screen 7.

Note that the substrate 11 of the optical device 4 may be made up of a black color substrate that absorbs the peripheral beam that is not diffracted by the hologram optical element 12.

Figure 8:
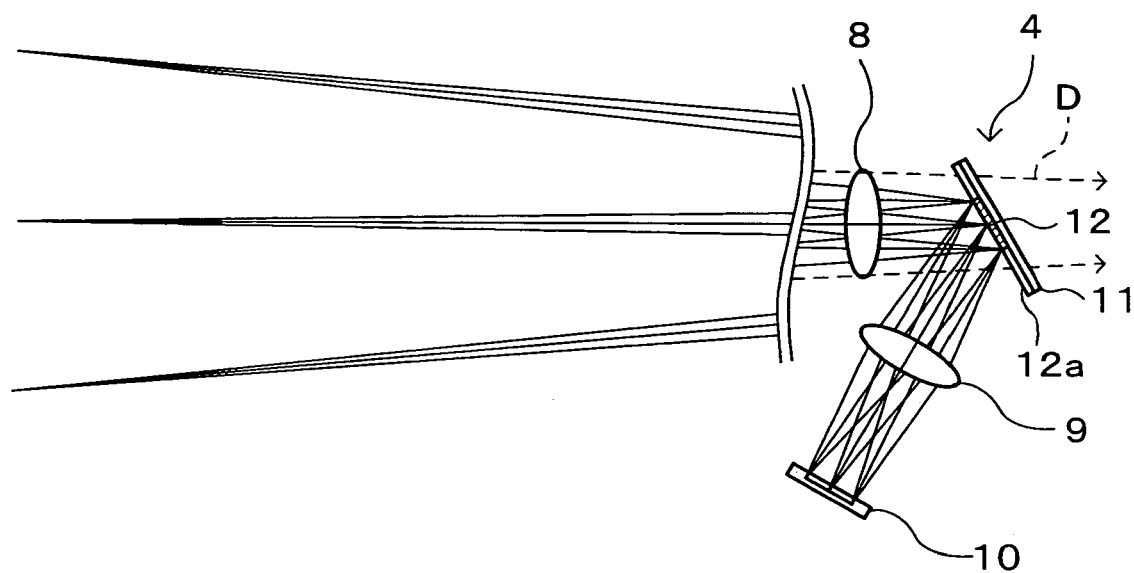
FIG. 8 is a cross section showing a general structure of an imaging device utilizing the optical device.
Figure 8:
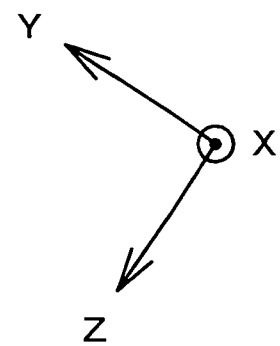

In addition, FIG. 8 is a cross section showing a general structure of an imaging device utilizing the optical device 4. This device includes the optical device 4, imaging lenses 8 and 9 and an imaging sensor 10 made up of a CCD, for example. Note that the hologram optical element 12 of the optical device 4 has a negative optical power, so it cooperates with the imaging lenses 8 and 9 so as to realize a high optical performance.

The center beam of object light (reproducing light) enters the optical device 4 via the imaging lens 8, is diffracted by the hologram optical element 12, and is focused on the imaging surface of the imaging sensor 10 by the imaging lens 9 so as to form an image. On the contrary, the peripheral beam of the object light (the beam shown by the broken line D in FIG. 8) passes through the substrate 11 since it does not enter the hologram optical element 12 although it enters the optical device 4 via the imaging lens 8. Therefore, a high quality image formed only by the center beam of the object light can be formed in the imaging sensor 10.

Figure 9:
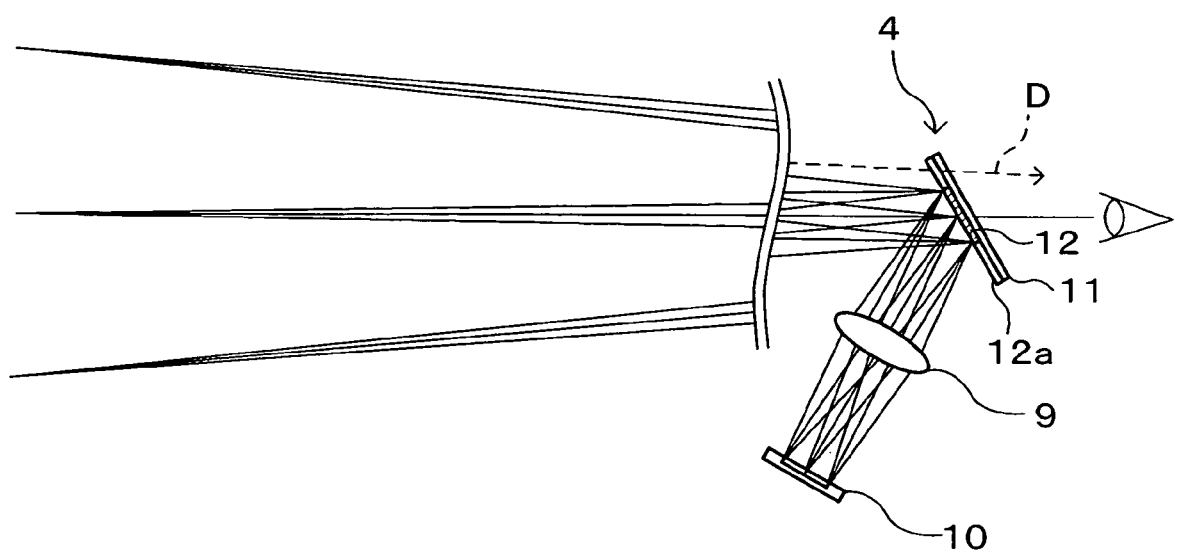
FIG. 9 is a cross section showing another structure of an imaging device utilizing the optical device.
Figure 9:
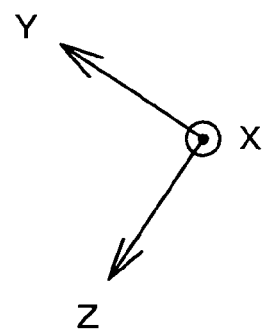

In addition, FIG. 9 is a cross section showing another structure of the imaging device utilizing the optical device 4. This device includes the optical device 4, the imaging lens 9 and the imaging sensor 10. Note that the hologram optical element 12 of the optical device 4 has a positive optical power, so it cooperates with the imaging lens 9 so as to realize a high optical performance.

The center beam of object light (reproducing light) enters the optical device 4, is diffracted by the hologram optical element 12, and is focused on the imaging surface of the imaging sensor 10 by the imaging lens 9 so as to form an image. On the contrary, the peripheral beam of the object light (the beam shown by the broken line D in FIG. 9) passes through the substrate 11 since it does not enter the hologram optical element 12 although it enters the optical device 4. Therefore, a high quality image formed only by the center beam of the object light can be formed in the imaging sensor 10. In addition, since the hologram optical element 12 passes light except for light having a specific wavelength and entering at a specific incident angle, the observer can observe an image formed by the object light that passes through the hologram optical element 12.

Second Embodiment

Another embodiment of the present invention will be described as follows with reference to the drawings. For convenience of description, the same elements as in the structure of the first embodiment are denoted by the same reference numerals, and descriptions thereof will be omitted.

(2-1. Structure of the Image Display Device)

Figure 10:
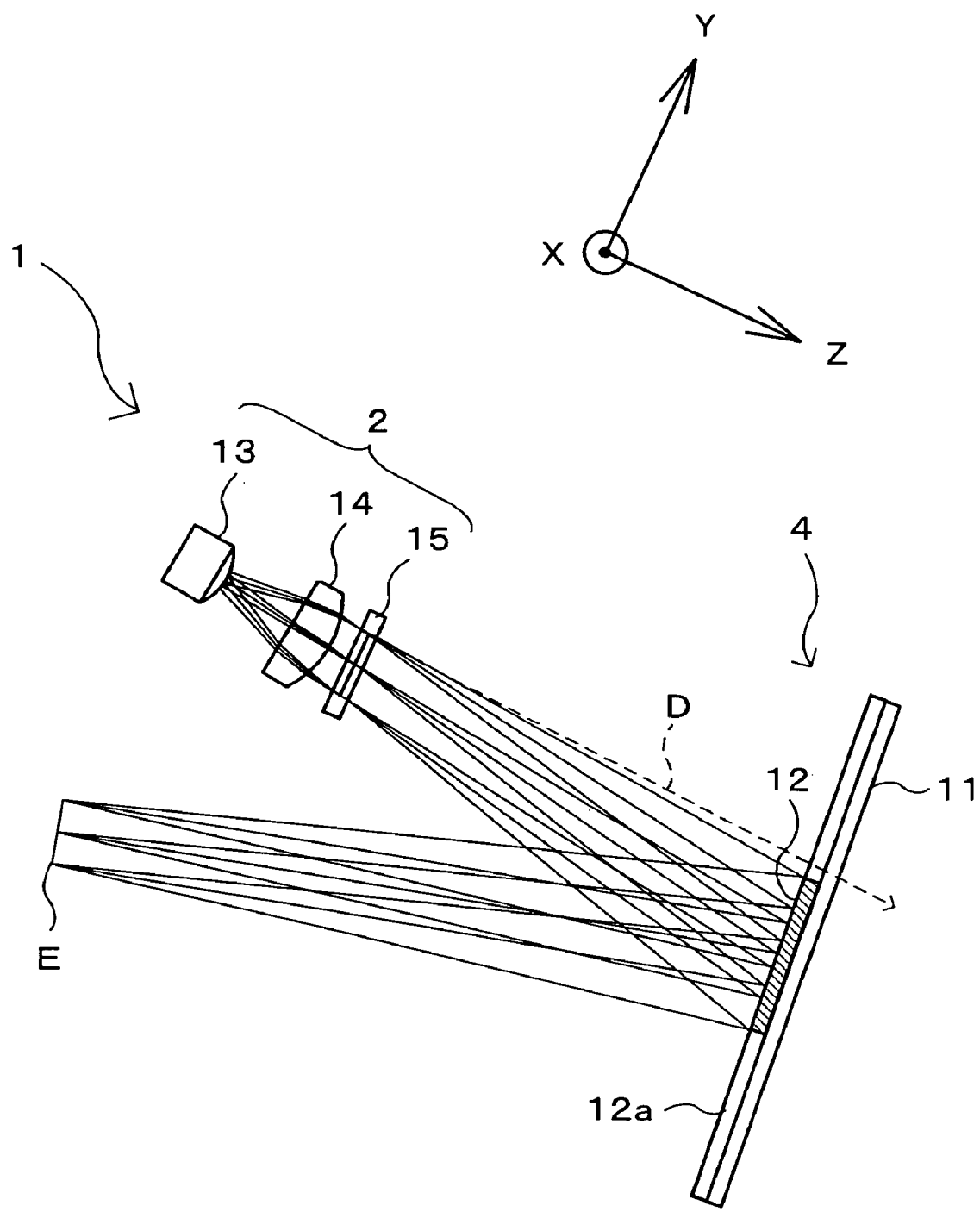
FIG. 10 is a cross section showing a general structure of an image display device according to another embodiment of the present invention.
Figure 11:
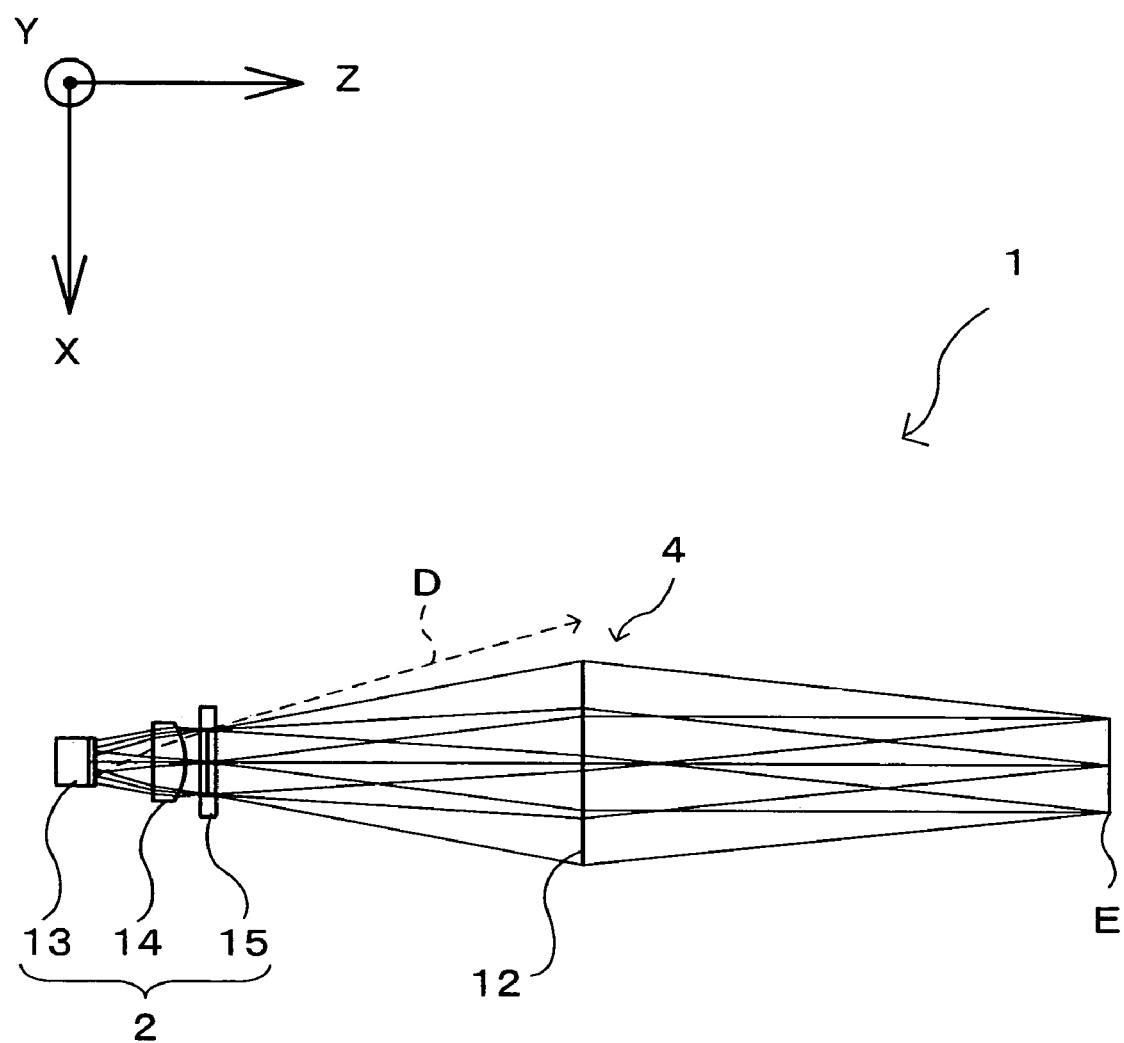
FIG. 11 is an explanatory diagram showing an optical path in the image display device in the state developed optically in one direction.

FIG. 10 is a cross section showing a general structure of an image display device 1 according to the second embodiment, and FIG. 11 is an explanatory diagram showing an optical path in the image display device 1 in the state developed optically in one direction. This image display device 1 includes a display element 2 and an optical device 4.

Figure 12:
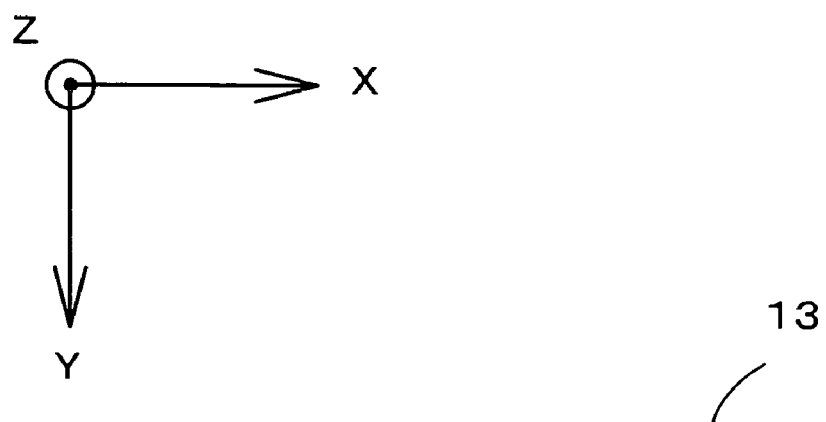
FIG. 12 is a plan view of a light source of the image display device observed from an LCD side.
Figure 12:
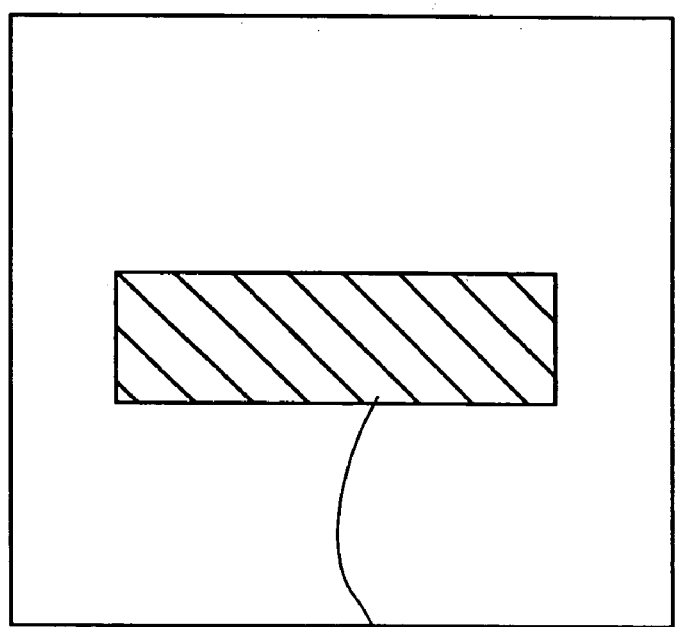

The display element 2 includes a light source 13, a condensing lens 14 and a light modulation element 15. The light source 13 emits light that is supplied to the light modulation element 15. In this embodiment, particularly, the light source 13 is made up of a white color light source (a white color LED) that emits light of white color by exciting a fluorescent material by blue color light or ultraviolet light. FIG. 12 is a plan view of the light source 13 viewed from the light modulation element 15 side. The light source 13 has a slit-like light emission region 13a with a longitudinal direction (X-direction) that is perpendicular to the incidence plane of the optical axis to the hologram optical element 12. The dimension of the light emission region 13a is 4 mm in the X-direction and 1.5 mm in the Y-direction, for example. The light source 13 emits light of white color (including light components in red, green and blue wavelength ranges corresponding to three primary colors) as a slit-like beam from this light emission region 13a.

The condensing lens 14 is made up of a cylindrical lens that condenses light from the light source 13 in the Y-direction, for example. The light modulation element 15 modulates light supplied from the light source 13 in accordance with an image data so as to display an image corresponding to the image data. The light modulation element 15 is made up of a transmission type LCD, for example. Note that the light modulation element 15 may be made up of other element such as a reflection type LCD, an EL display element, a DMD or the like.

The optical device 4 is made up of the hologram optical element 12 formed on the substrate 11. In this embodiment too, similarly to the first embodiment, the hologram optical element 12 is formed in the area for diffracting only the center beam of the reproducing light. Furthermore, in this embodiment, the hologram optical element 12 has a positive power that is axially asymmetric, and it is manufactured to diffract image light in the wavelength range of 465±5 nm, 521±5 nm and 634±5 nm as expressed in full width at half maximum centered around the peak diffraction efficiency wavelength. Further details about the method for manufacturing the hologram optical element 12 in this embodiment will be described later.

According to the structure described above, the light emitted from the light emission region 13a of the light source 13 is condensed by the condensing lens 14 in the Y-direction so as to irradiate the light modulation element 15 and is modulated by the light modulation element 15. The center beam of the image light from the light modulation element 15 is diffracted by the hologram optical element 12 of the optical device 4 and directed to the optical pupil E. In this case, the hologram optical element 12 is formed to be larger in the direction perpendicular to the optical axis incidence plane than in the direction parallel to the optical axis incidence plane, and the light source 13 has substantially a conjugate relationship with the optical pupil E. Therefore, at the optical pupil E, the size of the light emission region 13a of the light source 13 (x=4 mm, y=1.5 mm) is magnified three times the image magnification in the optical system, and further enlarged by a diffusion of approximately one degree in the light modulation element 15, resulting in the size of x=13 mm and y=7 mm. In contrast, the peripheral beam of the image light from the light modulation element 15 does not enter the hologram optical element 12 but passes through the substrate 11.

As described above, in this embodiment too, the hologram optical element 12 is formed only in the area for diffracting only the center beam of the reproducing light. Therefore, the observer can observe a high quality image formed by the center beam having high optical performance. In addition, a flare and a ghost due to the peripheral beam (the beam shown by the broken line D in FIGS. 10 and 11) can be relieved.

Further, in this embodiment, since the optical pupil E is larger than a human pupil (approximately 3 mm) both in the X-direction and the Y-direction, the observer can observe the image easily. In addition, since the light source 13 and the optical pupil E have substantially a conjugate relationship to each other, a bright image with little loss can be provided to the observer.

(2-2. Effect of Reducing Color Shading)

In this embodiment, the hologram optical element 12 is formed to be larger in the direction perpendicular to the optical axis incidence plane than in the direction parallel to the optical axis incidence plane as described above. As a result, the observer can observe a high quality image with little color shading since it is affected not so much by the wavelength characteristics (wavelength selectivity) of the hologram optical element 12. Further details about the reason are as follows.

First, a relationship between the incident angle and the wavelength selectivity in the hologram optical element 12 will be described. In the hologram optical element 12 having interference fringes that diffract light having an incident angle larger than zero, the wavelength selectivity is smaller (i.e., a shift of a diffraction wavelength due to a shift of an incident angle is smaller) in the direction perpendicular to the incidence plane than in the direction parallel to the incidence plane. In other words, angle selectivity with respect to a shift of the incident angle to the interference fringes is lower in the direction perpendicular to the incidence plane than in the direction parallel to the incidence plane. This is because of the following reason. If light having an incident angle enters the interference fringes of the hologram optical element 12, a shift of the incident angle within the incidence plane (YZ plane) becomes a shift of the incident angle as it is, so it has much influence to the diffraction wavelength. However, a shift of an angle in the direction perpendicular to the incidence plane is small as a shift of the incident angle and has little influence to the diffraction wavelength.

Therefore, when light having an incident angle shifted from a predetermined incident angle enters the interference fringes of the hologram optical element 12, the diffraction wavelength is shifted larger by the shift of angle in the direction parallel to the incidence plane than by the shift of angle in the direction perpendicular to the incidence plane (i.e., the wavelength selectivity is larger in the direction parallel to the incidence plane).

Therefore, if the hologram optical element 12 is formed to be larger in the direction perpendicular to the optical axis incidence plane than in the direction parallel to the optical axis incidence plane so that the optical pupil E is formed to be smaller in the Y-direction with larger variation of the diffraction wavelength, a range of variation of the diffraction wavelength can be narrowed. Thus, color shading on the optical pupil E can be relieved. In addition, even if the optical pupil E is formed to be larger in the direction perpendicular to the incidence plane, an image with high color purity can be provided to the observer.

Although light outside the optical axis incidence plane has the incidence plane that is not parallel slightly to the optical axis incidence plane, color shading is not increased with respect to the optical axis incidence plane as a reference since a shift of angle in the direction perpendicular to the incidence plane has little influence to the diffraction wavelength.

Further, in this embodiment, the size of the light emission region 13a of the light source 13 is 4 mm in the X-direction and 1.5 mm in the Y-direction. Therefore, it can be said that the light source 13 is formed to be larger in the direction perpendicular to the optical axis incidence plane than in the direction parallel to the incidence plane of the optical axis to the hologram optical element 12. As described above, the direction perpendicular to the incidence plane is the direction in which the hologram optical element 12 has a smaller wavelength characteristic. Therefore, when the light source 13 is formed to be larger in the direction of smaller wavelength characteristic, a high quality image with little color shading can be provided to the observer.

(2-3. Other Effects)

In this embodiment, the light source 13 is equipped with a lens, and its angle of radiation is set to a small value as 90 degrees, for example. Thus, it has little waste of light that is not used for forming the optical pupil E (i.e., has a high efficiency of using light). From this viewpoint too, a bright image can be provided to the observer.

In addition, since the light source 13 is made up of a white color light source, it is not required to mix colors of red, green and blue. Thus, a bright image can be provided to the observer by an inexpensive structure in which the light source 13 and the optical pupil E has a conjugate relationship.

In addition, when the light source 13 is made up of the white color light source, the light emission area is larger in the X-direction. Therefore, it is not necessary to provide a one-way diffuser plate for diffusing the incident light in the X-direction, for example. Since the one-way diffuser plate is needless, a cost of the image display device 1 can be reduced.

Note that it is possible to provide the one-way diffuser plate. In this case, the optical pupil E can be further enlarged in the X-direction while keeping high color purity by diffusing light in the X-direction in which the wavelength selectivity is not high. Therefore, the one-way diffuser plate may be provided as necessity.

Note that it is also possible to use the diffuser plate for diffusing light in the Y-direction too so that the optical pupil E is enlarged in the Y-direction. In this case, the larger in the Y-direction the optical pupil E becomes, the larger the color shift becomes. Therefore, it is desirable that a size of the optical pupil E in the Y-direction is approximately 10 mm at most.

(2-4. Method for Manufacturing the Hologram Optical Element)

Figure 13:
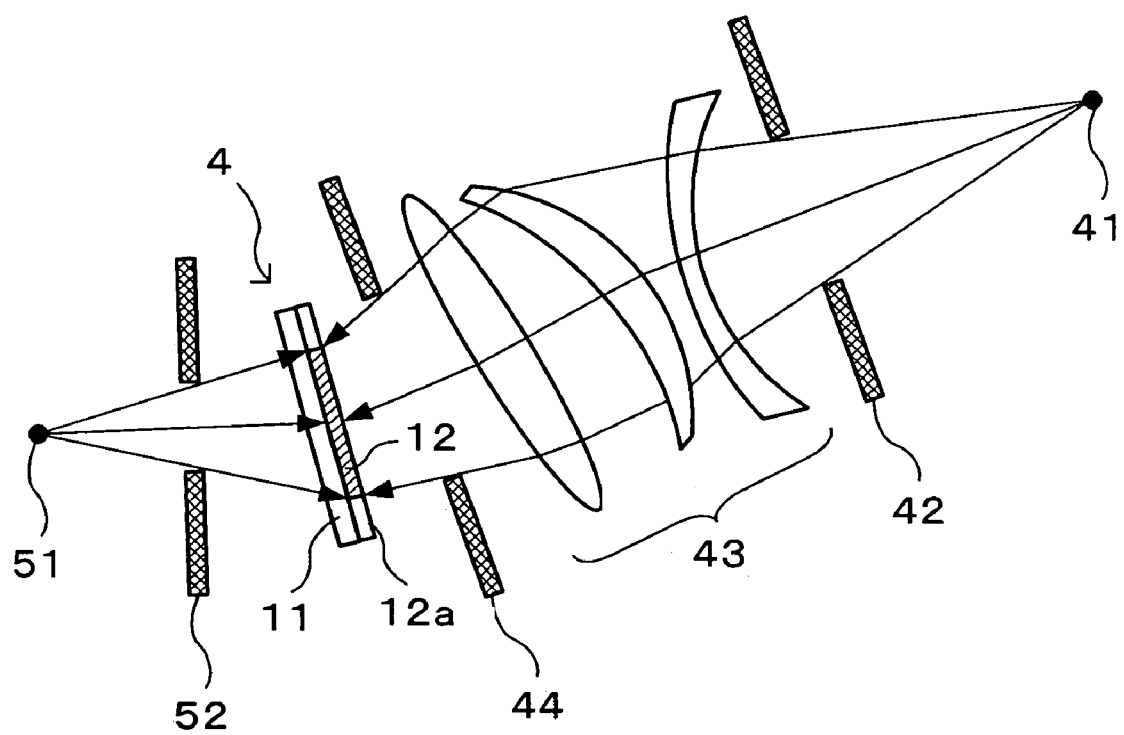
FIG. 13 is a cross section showing a general structure of the optical system that is used for manufacturing the hologram optical element of the optical device in the image display device.

Next, a method for manufacturing the hologram optical element 12 according to this embodiment will be described. FIG. 13 is a cross section showing a general structure of the optical system that is used for manufacturing the hologram optical element 12 according to this embodiment.

First, the hologram photosensitive material 12a is applied on the substrate 11. Note that the hologram photosensitive material 12a is applied on the substrate 11 in an area larger than the irradiation areas of the two beams for manufacture. Then, the substrate 11 on which the hologram photosensitive material 12a is applied is disposed at a predetermined position of the optical system as shown in FIG. 13.

In the optical system, a laser beam from a light source (not shown) is divided into two beams, which are converted into point light sources 41 and 51, respectively. Outgoing light from the point light source 41 (one of the two beams for manufacture) passes through a diaphragm 42, a manufacturing optical system 43 and a diaphragm 44 in this order and irradiates the hologram photosensitive material 12a on the substrate 11 from the front side (opposite side to the substrate 11). When the outgoing light irradiates the hologram photosensitive material 12a via the manufacturing optical system 43, the manufactured hologram optical element 12 can have a positive power that is axially asymmetric. Note that the irradiation area of the outgoing light on the hologram photosensitive material 12a is the same as the area for diffracting only the center beam of the reproducing light (the same as the area Q shown in FIG. 1).

On the other hand, outgoing light from the point light source 51 is restricted by a diaphragm 52 to have a smaller beam diameter and irradiates the hologram photosensitive material 12a on the substrate 11 from the rear side (substrate 11 side). Note that the irradiation area of the outgoing light on the hologram photosensitive material 12a is the same as the area for diffracting only the center beam of the reproducing light (the same as the area Q shown in FIG. 1).

When these two beams irradiate the hologram photosensitive material 12a, interference fringes are recorded in the overlapping part of the irradiation areas of the two beams on the hologram photosensitive material 12a, thereby the hologram optical element 12 is manufactured. After that, a baking process and a fixing process are performed to complete the optical device 4.

In the optical system described above, since numerical apertures of the point light sources 41 and 51 (i.e., beam diameters of the outgoing light) are restricted by the diaphragms 42, 44 and 52, two beams for manufacture can be adjusted to have the same size on the hologram photosensitive material 12a. Thus, the hologram optical element 12 can be manufactured only in the area to which the center beam of the reproducing light having good optical performance is irradiated. In addition, since the two beams for manufacture interfere with each other in the same area, interference due to one of the laser beams hardly occur. Therefore, undesired interference fringes are not recorded in the hologram photosensitive material 12a. Thus, the hologram optical element 12 having good optical performance with little flare and ghost can be manufactured, and an image with high quality can be provided to the observer.

In addition, since the two beams that are used for manufacture are formed by restricting an angle of divergence of light emitted from the corresponding point light sources 41 and 51 with the diaphragms 42, 44 and 52, a size of the hologram optical element 12 on the substrate 11 can be controlled easily and securely at a low cost.

Although the beam diameter of the outgoing light from the point light source 41 is restricted by the two diaphragms 42 and 44, the diaphragm 42 first restricts it so as to suppress undesired light reflected or scattered by an edge or the like of the manufacturing optical system 43. Then, the beam diameter of the outgoing light is restricted by the diaphragm 44 so that undesired light reflected between surfaces in the manufacturing optical system 43 is prevented from reaching the hologram photosensitive material 12a.

Third Embodiment

Still another embodiment of the present invention will be described as follows with reference to the drawings. For convenience of description, the same elements as in the structure of the first or the second embodiment are denoted by the same reference numerals, and descriptions thereof will be omitted.

(3-1. Structure of the Image Display Device)

Figure 14:
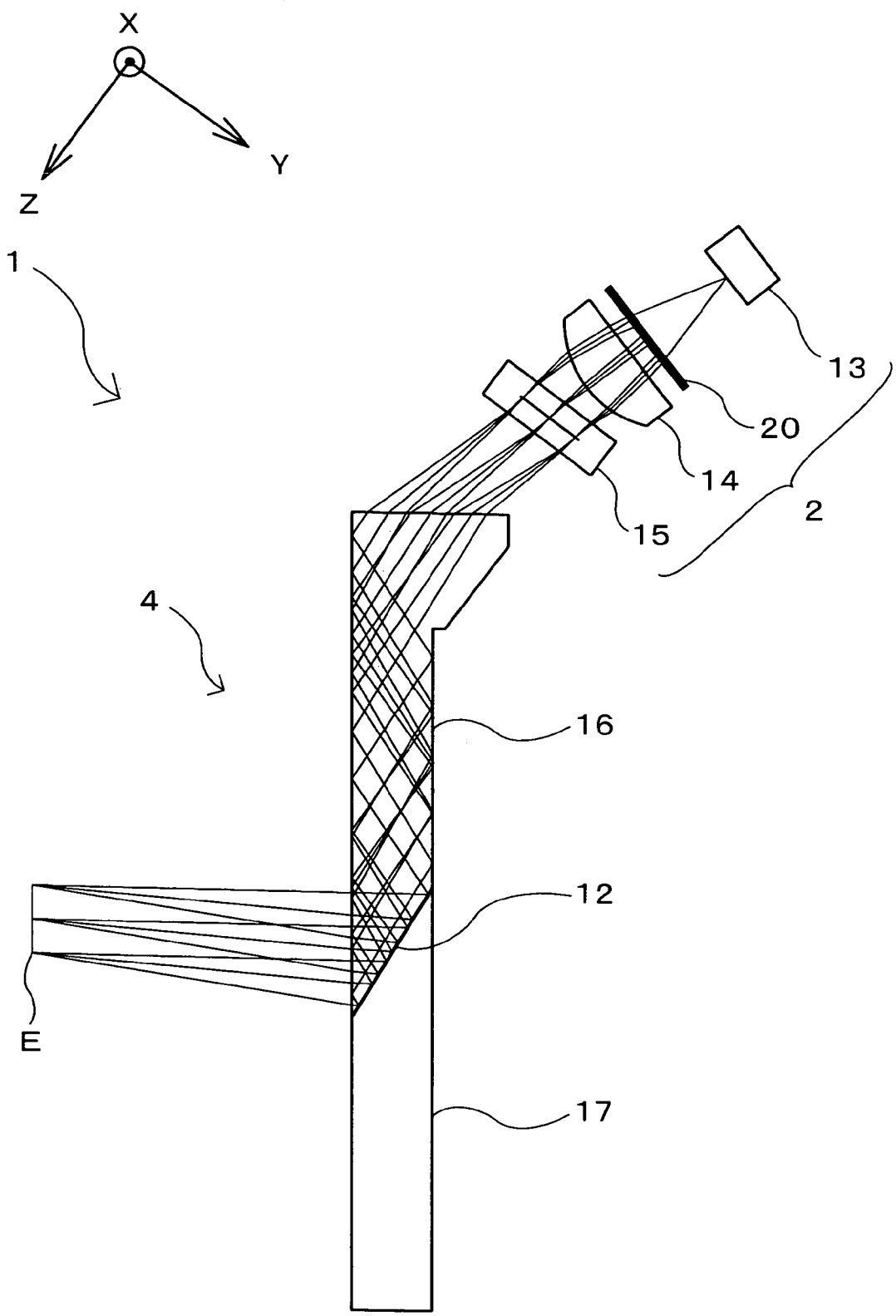
FIG. 14 is a cross section showing a general structure of an image display device according to still another embodiment of the present invention.
Figure 15:
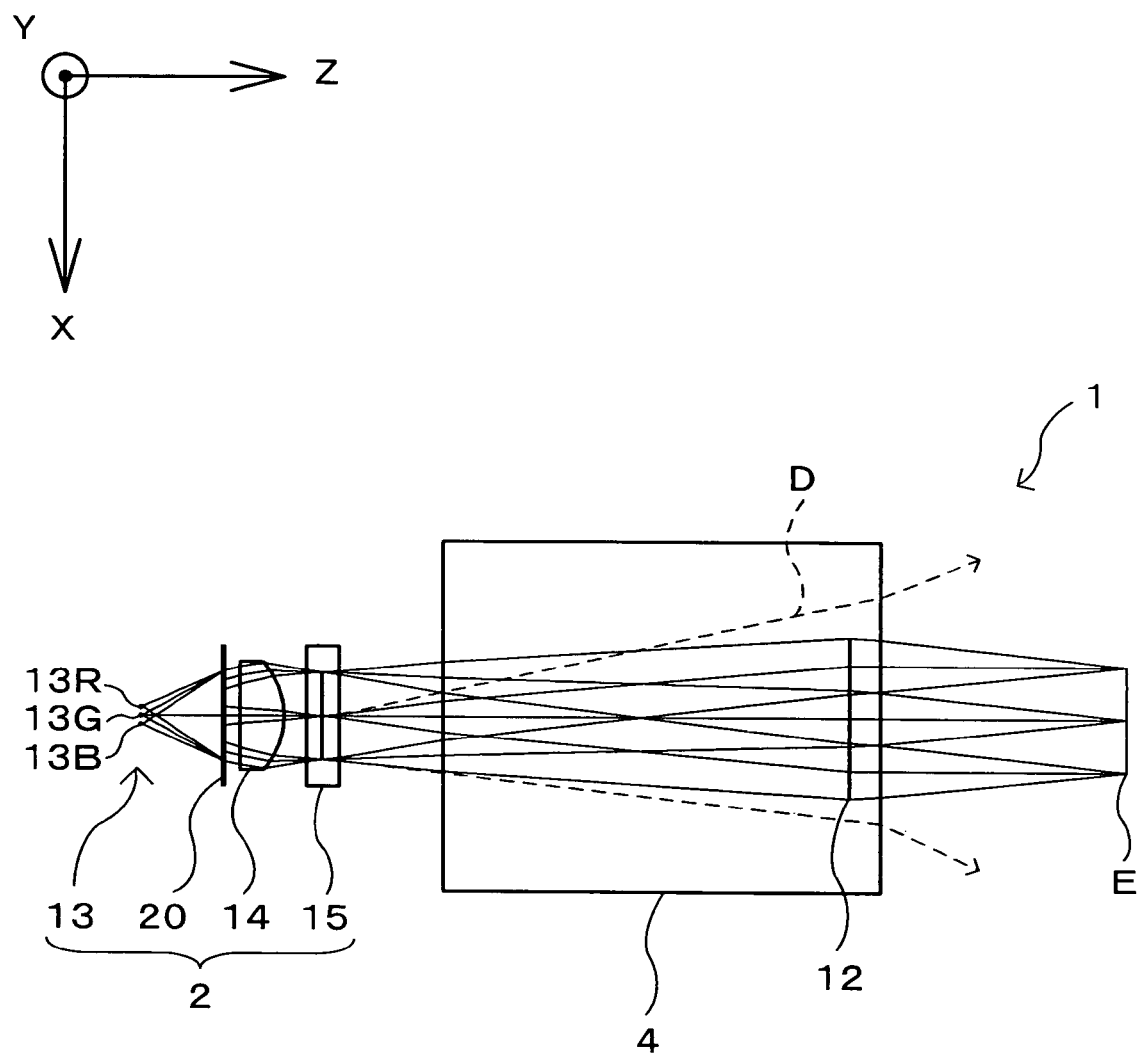
FIG. 15 is an explanatory diagram showing an optical path in the image display device in the state developed optically in one direction.

FIG. 14 is a cross section showing a general structure of an image display device 1 according to this embodiment, and FIG. 15 is an explanatory diagram showing an optical path in the image display device 1 in the state developed optically in one direction. This image display device 1 includes a display element 2 and an optical device 4, and structures of the display element 2 and the optical device 4 are slightly different from those in the second embodiment.

The display element 2 includes a light source 13, a one-way diffuser plate 20, a condensing lens 14 and a light modulation element 15.

In this embodiment, the light source 13 is made up of an RGB integrated LED having three light emission portions 13R, 13G and 13B (see FIG. 15) emitting three wavelengths of light corresponding to three primary colors of red (R), green (G) and blue (B). The light source 13 is arranged to be substantially conjugate optically with the optical pupil E in the Y-direction. The light emission portions 13R, 13G and 13B emit light of three wavelength ranges, which are respectively 462±12 nm, 525±17 nm and 635±11 nm as expressed in full width at half maximum centered around the peak light intensity wavelength. The light intensity of the light source 13 is adjusted in consideration of a diffraction efficiency of the hologram optical element 12 and a transmittance of the light modulation element 15, so that a white color can be displayed.

In addition, the light emission portions 13R, 13G and 13B are arranged in the X-direction that has a large diffusion due to the one-way diffuser plate 20. Thus, uneven intensity of each color on the optical pupil E is decreased so that the color shading can be relieved.

The one-way diffuser plate 20 that diffused outgoing light from the light source 13 has different diffusing powers depending on the direction. More specifically, the one-way diffuser plate 20 diffuses the incident light in the X-direction by approximately 40 degrees, while it diffused the incident light in the Y-direction by approximately 0.5 degrees. In addition, the one-way diffuser plate 20 has an optically flat face on the light source 13 side and an uneven face for diffusing light on the condensing lens 14 side. Therefore, divergent light from the light source 13 is refracted at the flat face of the one-way diffuser plate 20 to be condensed slightly and diffused, so that the condensed state is preserved slightly. Therefore, the one-way diffuser plate 20 has a slight function of a convex lens, and the incident light of the one-way diffuser plate 20 is slightly refracted in the direction necessary for forming the optical pupil E.

The condensing lens 14 is made up of a cylindrical lens for condensing the light diffused by the one-way diffuser plate 20 in the Y-direction, and it is arranged so that the light diffused by the one-way diffuser plate 20 can form the optical pupil E efficiently. In this embodiment, the optical pupil E has dimensions of 6 mm in the X-direction and 2 mm in the Y-direction. In this way, since the optical pupil E has a size of 6 mm that is larger than a human's pupil (approximately 3 mm) in one direction (X-direction), the observer can observe the image easily. In contrast, since the optical pupil E has a size of 2 mm that is smaller than the human's pupil in another direction (Y-direction), light from the light source 13 can be condensed in the optical pupil E with little loss in the direction. Thus, the observer can observe a bright image.

The light modulation element 15 has a color filter so as to display a color image by modulating the outgoing light from the light source 13 in accordance with the image data (like an LCD, for example). The light modulation element 15 is arranged so that the long side direction of the rectangular display area is the X-direction while the short side direction is the Y-direction.

The optical device 4 constitutes an ocular optical system for conducting the image light from the light modulation element 15, i.e., the light corresponding to the color image displayed by the light modulation element 15 to the observer's pupil. In this embodiment, the optical device 4 includes an ocular prism 16 (a substrate and a first transparent substrate), a deflection prism 17 (a second transparent substrate) and a hologram optical element 12.

The ocular prism 16 conducts the image light from the light modulation element 15 to the observer's pupil via the hologram optical element 12 by means of total reflection inside the ocular prism 16, while it passes external light and conducts it to the observer's pupil. The ocular prism 16 as well as the deflection prism 17 is made of an acrylate resin, for example. This ocular prism 16 has a wedge-like shape in which the lower end portion of parallel flat plates becomes thinner as being close to the end while the upper end portion of the same becomes thicker as being close to the end. In addition, the ocular prism 16 is bonded to the deflection prism 17 with an adhesive so as to sandwich the hologram optical element 12 that is disposed at the lower end portion thereof between them.

Figure 17A:
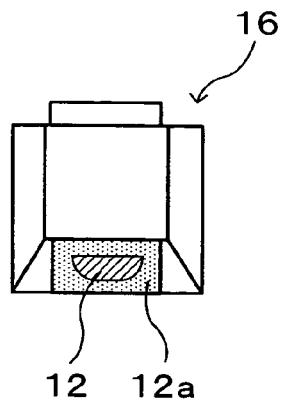
FIG. 17A is a plan view of an ocular prism that constitutes the optical device.
Figure 17B:
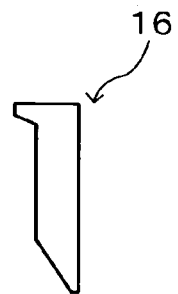
FIG. 17B is a right side view of the ocular prism.
Figure 17C:
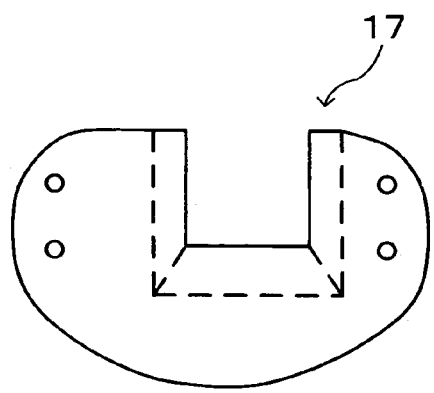
FIG. 17C is a plan view of a deflection prism that constitutes the optical device.
Figure 17D:
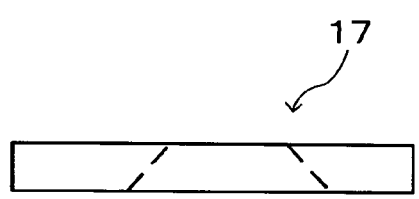
FIG. 17D is a bottom view of the deflection prism.
Figure 17E:
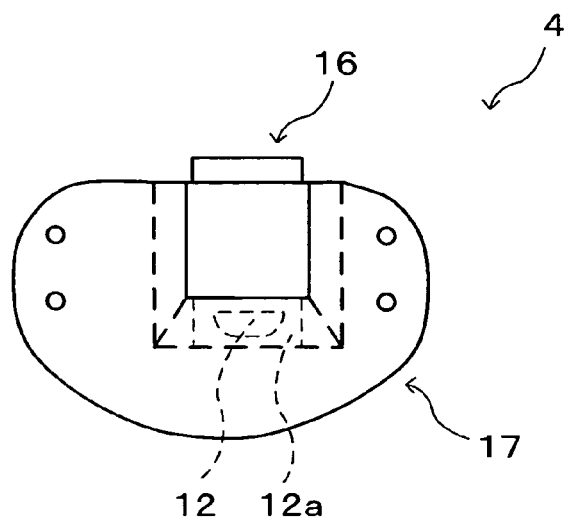
FIG. 17E is a plan view of the optical device.

The deflection prism 17 is made up of parallel flat plates having substantially a U-shape in a plan view (see FIG. 17C). When the deflection prism 17 is bonded to the lower end portion and both side faces (left and right end faces) of the ocular prism 16, they are integrated to be substantially parallel flat plates. When this deflection prism 17 is bonded to the ocular prism 16, generation of a distortion in the external image observed by the observer via the optical device 4 can be prevented.

More specifically, if the deflection prism 17 is not bonded to the ocular prism 16, the external light is refracted when it passes through the lower end portion of the wedge-like shape of the ocular prism 16. Therefore, a distortion occurs in the external image observed via the ocular prism 16. However, when the deflection prism 17 is bonded to the ocular prism 16 to make the integral parallel flat plates substantially, the refraction that may occur when the external light passes through the lower end portion of the wedge-like shape of the ocular prism 16 can be cancelled by the deflection prism 17. As a result, a distortion is prevented from occurring in the external image observed in a see-through manner.

The hologram optical element 12 is a volume phase type reflection hologram that diffracts image light from the light modulation element 15 (light having wavelengths corresponding to the three primary colors) so that the image displayed by the light modulation element 15 is magnified and conducted to the observer's pupil as a virtual image. In this embodiment too, similarly to the first embodiment, the hologram optical element 12 is formed on the ocular prism 16 only in the area for diffracting only the center beam of the reproducing light (see FIG. 17A). A specific size of the hologram optical element 12 is like x=10 mm and y=5 mm, so that it has a larger size in the direction perpendicular to the optical axis incidence plane than the direction parallel to the optical axis incidence plane. Further details about the method for manufacturing the hologram optical element 12 in this embodiment will be described later.

In addition, the hologram optical element 12 has a positive power that is axially asymmetric, and it is manufactured to diffract image light in the wavelength range of 465±5 nm, 521±5 nm and 634±5 nm as expressed in full width at half maximum centered around the peak diffraction efficiency wavelength. Since the full width at half maximum of the diffraction efficiency of the hologram optical element 12 is less than 20 nm, an image with high color purity can be provided to the observer. In addition, a difference between the peak light intensity wavelength of the light source 13 and the peak diffraction efficiency wavelength of the hologram optical element 12 is less than or equal to 10 nm for each of R, G and B colors. Therefore, a bright image can be provided to the observer with a high efficiency of using light from the light source 13.

In the structure described above, light emitted from the light source 13 is diffused by the one-way diffuser plate 20, is condensed by the condensing lens 14 and enters the light modulation element 15. The light that has entered the light modulation element 15 is modulated in accordance with the image data and goes out as the image light via the color filter. Thus, the light modulation element 15 displays a color image.

The center beam of the image light from the light modulation element 15 enters the ocular prism 16 of the optical device 4 from its upper end face and enters the hologram optical element 12 after a plurality of times of total internal reflection between two opposed faces. The light that has entered the hologram optical element 12 is reflected and reaches the optical pupil E. At the position of the optical pupil E, the observer can observe an enlarged virtual image of the image displayed by the light modulation element 15. In addition, the peripheral beam of the image light does not enter the hologram optical element 12 although it enters the ocular prism 16, so it is not conducted to the optical pupil E.

In contrast, the ocular prism 16 and the deflection prism 17 pass most of the external light, so that the observer can observe the external image. Therefore, the image formed by the center beam of the image light from the light modulation element 15 (the virtual image) is observed in such a way of overlapping a part of the external image.

(3-2. Effects)

In this embodiment too, the hologram optical element 12 is formed only in the area for diffracting only the center beam of the reproducing light. Therefore, the observer can observe a high quality image formed by the beam with high optical performance (the center beam), and a flare or a ghost due to the peripheral beam (the beam shown by the broken line D in FIG. 15) can be relieved.

In addition, since the conventional shading plate for relieving a flare or a ghost due to the peripheral beam is unnecessary, a wide field of view for the observer to observe an external image the external image can be secured even if the optical device 4 is used as a combiner between the image light and the external light as described in this embodiment. In addition, downsizing (in particular a low profile) and cost reduction of the image display device 1 can be realized.

Furthermore, in the image display device 1 according to this embodiment, image light emitted from the light modulation element 15 is conducted to the hologram optical element 12 by the total internal reflection inside the ocular prism 16. Therefore, similarly to a usual lens of glasses, thicknesses of the ocular prism 16 and the deflection prism 17 can be approximately 3 mm, so that the image display device 1 can be downsized and reduced in weight. In addition, since the ocular prism 16 is used for the total internal reflection of the image light from the light modulation element 15, a high transmittance for the external light is secured so that a bright external image can be provided to the observer.

In addition, the hologram optical element 12 has a positive optical power that is axially asymmetric and a function similar to that of an aspherical concave mirror having a positive power. Therefore, flexibility in arranging optical elements constituting the device can be enhanced so that the device can be downsized easily. In addition, an image after appropriate correction of aberration can be provided to the observer. Moreover, the hologram optical element 12 works as a combiner between the image light from the light modulation element 15 and the external light for conducting them to the observer's pupil simultaneously. Therefore, the observer can observe simultaneously the external image and the image from the light modulation element 15 via the hologram optical element 12.

Further, in this embodiment too, the hologram optical element 12 is formed to be larger in the direction perpendicular to the optical axis incidence plane than the direction parallel to the optical axis incidence plane similarly to the second embodiment. Thus, the observer can observe a high quality image with little color shading without affected so much by the wavelength characteristics of the hologram optical element 12 (wavelength selectivity). The detailed reason of this is already described in the second embodiment.

In this embodiment, the hologram optical element 12 is formed in the size for diffracting only the center beam of the reproducing light having good optical performance in both direction of the X-direction and the Y-direction. However, it is possible to form the hologram optical element 12 to be larger than the irradiation area of the beam having good optical performance in the Y-direction because the light source 13 and the optical pupil E has a conjugate relationship in the Y-direction. In this case, an image with high quality can be displayed by forming the light source 13 to be small so that the beam having good optical performance reaches the optical pupil E.

However, if the hologram optical element 12 is formed to be larger than the irradiation area of the beam having good optical performance, peripheral portions of the light emission portions 13R, 13G and 13B of the light source 13 may emit light, or the hologram optical element 12 diffuses light from the light source, resulting in that undesired light may reach the optical pupil E or a periphery thereof despite of the conjugate relationship. Therefore, it is better that the hologram optical element 12 is formed in the size only for diffracting the beam having good performance as described in this embodiment. In other words, when the hologram optical element 12 is formed in the size described in this embodiment, peripheral light having bad optical performance can be cut off securely so that a flare or a ghost can be relieved, and an image with high quality can be displayed.

Although the light modulation element 15 has a color filter for realizing a color display in this embodiment, it is possible to realize a color display by another structure in which each of red, green and blue color light from the light source 13 is supplied to the light modulation element 15 in a time sharing way so that the light modulation element 15 is made up of a ferroelectric liquid crystal display element.

(3-3. Method for Manufacturing the Hologram Optical Element)

Figure 16:
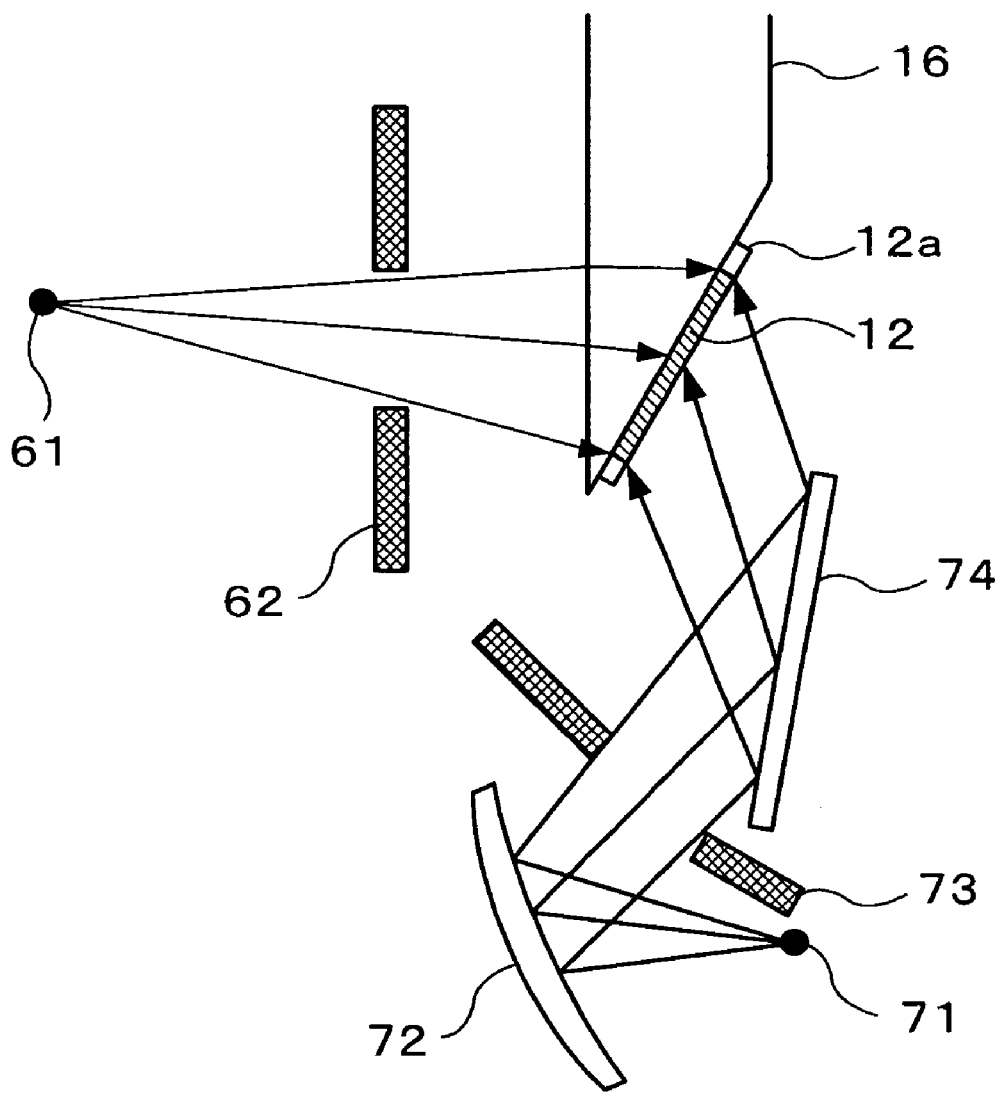
FIG. 16 is a cross section showing a general structure of an optical system that is used for manufacturing the hologram optical element of the optical device in the image display device.

A method for manufacturing the hologram optical element 12 according to this embodiment will be described. FIG. 16 is a cross section showing a general structure of the optical system that is used for manufacturing the hologram optical element 12 according to this embodiment. In addition, FIGS. 17A-17E show a plan view of an ocular prism 16, a right side view of the same, a plan view of a deflection prism 17, a bottom view of the same and a plan view of an optical device 4, respectively.

First, as shown in FIG. 17A, a hologram photosensitive material 12a is applied on the ocular prism 16 on the surface bonded to the deflection prism 17. Note that is it supposed that the hologram photosensitive material 12a is applied on the ocular prism 16 in the area larger than the irradiation areas of two beams for manufacture. Then, the substrate 11 on which the hologram photosensitive material 12a is applied is disposed at a predetermined position of the optical system as shown in FIG. 16.

In the optical system, a laser beam from a light source (not shown) is divided into two beams, which are converted into point light sources 61 and 71 for emitting light of red, green and blue colors each. Outgoing light from the point light source 61 (one of the two beams for manufacture) passes through a diaphragm 62 and irradiates the hologram photosensitive material 12a from the rear side (the ocular prism 16 side). Note that the irradiation area of the outgoing light on the hologram photosensitive material 12a is the area for diffracting only the center beam of the reproducing light.

On the other hand, outgoing light from the point light source 71 passes through a manufacturing optical system 72, a diaphragm 73 and a reflection mirror 74 in this order and irradiates the hologram photosensitive material 12a from the front side (the opposite side to the ocular prism 16). When the outgoing light irradiates the hologram photosensitive material 12a via the manufacturing optical system 72, the formed hologram optical element 12 has a positive power that is axially asymmetric. Note that the irradiation area of the outgoing light on the hologram photosensitive material 12a is the area for diffracting only the center beam of the reproducing light.

When these two beams irradiate the hologram photosensitive material 12a, interference fringes are recorded in the overlapping part of the irradiation areas of the two beams on the hologram photosensitive material 12a, so that the hologram optical element 12 is manufactured (see FIG. 17A). After that, a baking process and a fixing process are performed, and the ocular prism 16 on which the hologram optical element 12 is formed (see FIGS. 17A and 17B) is bonded to the deflection prism 17 (see FIGS. 17C and 17D), so that the optical device 4 is completed (see FIG. 17E).

In the optical system described above, since numerical apertures of the point light sources 61 and 71 (i.e., beam diameters of the outgoing light) are restricted by the diaphragms 62 and 73, two beams for manufacture can be adjusted to have the same size on the hologram photosensitive material 12a. Therefore, the hologram optical element 12 can be manufactured only in the area to which the center beam of the reproducing light having good optical performance is irradiated. In addition, since the two beams for manufacture interfere with each other in the same area, interference due to one of the laser beams hardly occur. Therefore, undesired interference fringes are not recorded in the hologram photosensitive material 12a. Thus, the hologram optical element 12 having good optical performance with little flare and ghost can be manufactured, and an image with high quality can be provided to the observer.

In addition, since the two beams that are used for manufacture are formed by restricting an angle of divergence of light emitted from the corresponding point light sources 61 and 71 with the diaphragms 62 and 73, a size of the hologram optical element 12 on the substrate 11 can be controlled easily and securely at a low cost.

Figure 18A:
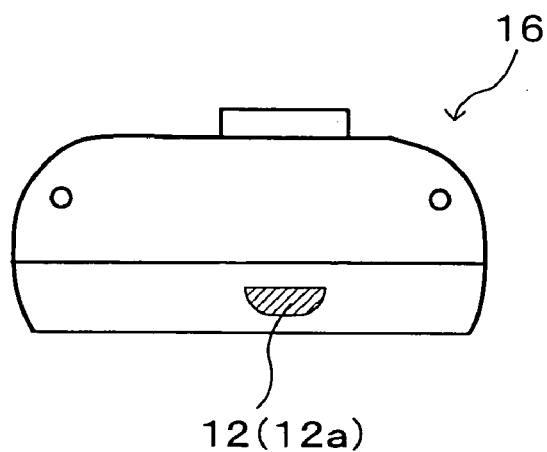
FIG. 18A is a plan view showing another structure of the ocular prism.
Figure 18B:
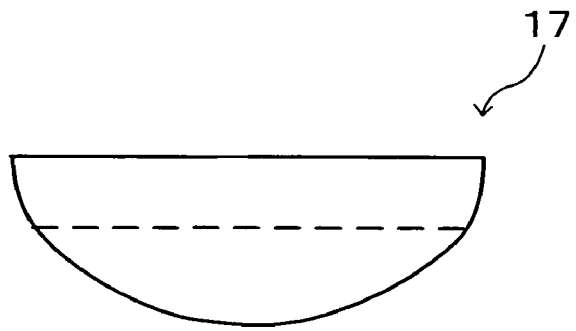
FIG. 18B is a plan view showing another structure of the deflection prism.
Figure 18C:
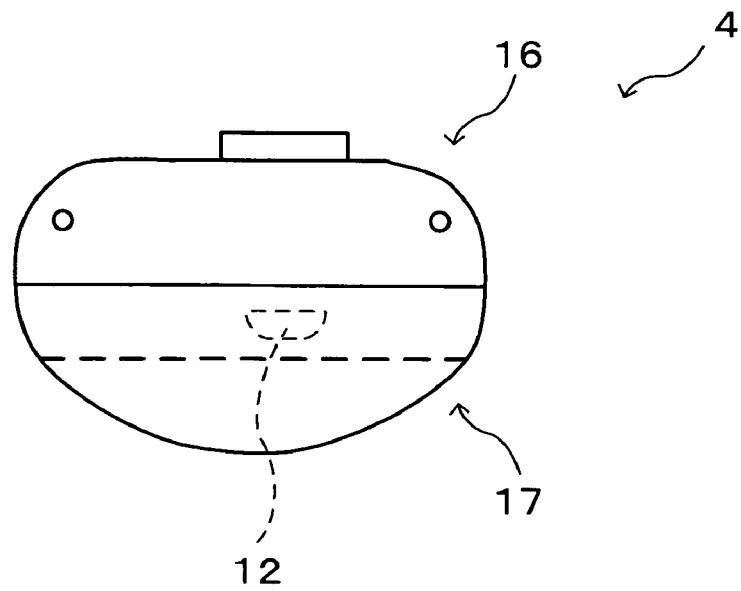
FIG. 18C is a plan view of the optical device that is manufactured by bonding the ocular prism to the deflection prism.

In addition, FIGS. 18A-18C are a plan view showing another structure of the ocular prism 16, a plan view showing another structure of the deflection prism 17 and a plan view of the optical device 4 formed by bonding the prisms 16 and 17 to each other, respectively. In FIG. 18A, the hologram photosensitive material 12a is applied on the surface of the ocular prism 16 to be bonded to the deflection prism 17 only in the area for diffracting only the center beam of the reproducing light. This hologram photosensitive material 12a is irradiated with two beams for manufacture for recording interference fringes, so that the hologram optical element 12 is manufactured.

The ocular prism 16 and the deflection prism 17 shown in FIGS. 18A and 18B have shapes such that they are bonded on one face, and their functions are respectively the same as the ocular prism 16 and the deflection prism 17 shown in FIGS. 17A and 17C. Therefore, the ocular prism 16 and the deflection prism 17 shown in FIGS. 18A and 18B can be used for constituting the optical device 4 that conducts image light from the display element 2 to the observer's pupil.

(3-4. Another Image Display Device)

Although the light source 13 includes a set of light emission portions 13R, 13G and 13B corresponding to red, green and blue colors in this embodiment, it is possible to structure the light source 13 to include a plurality sets of light emission portions 13R, 13G and 13B.

Figure 19:
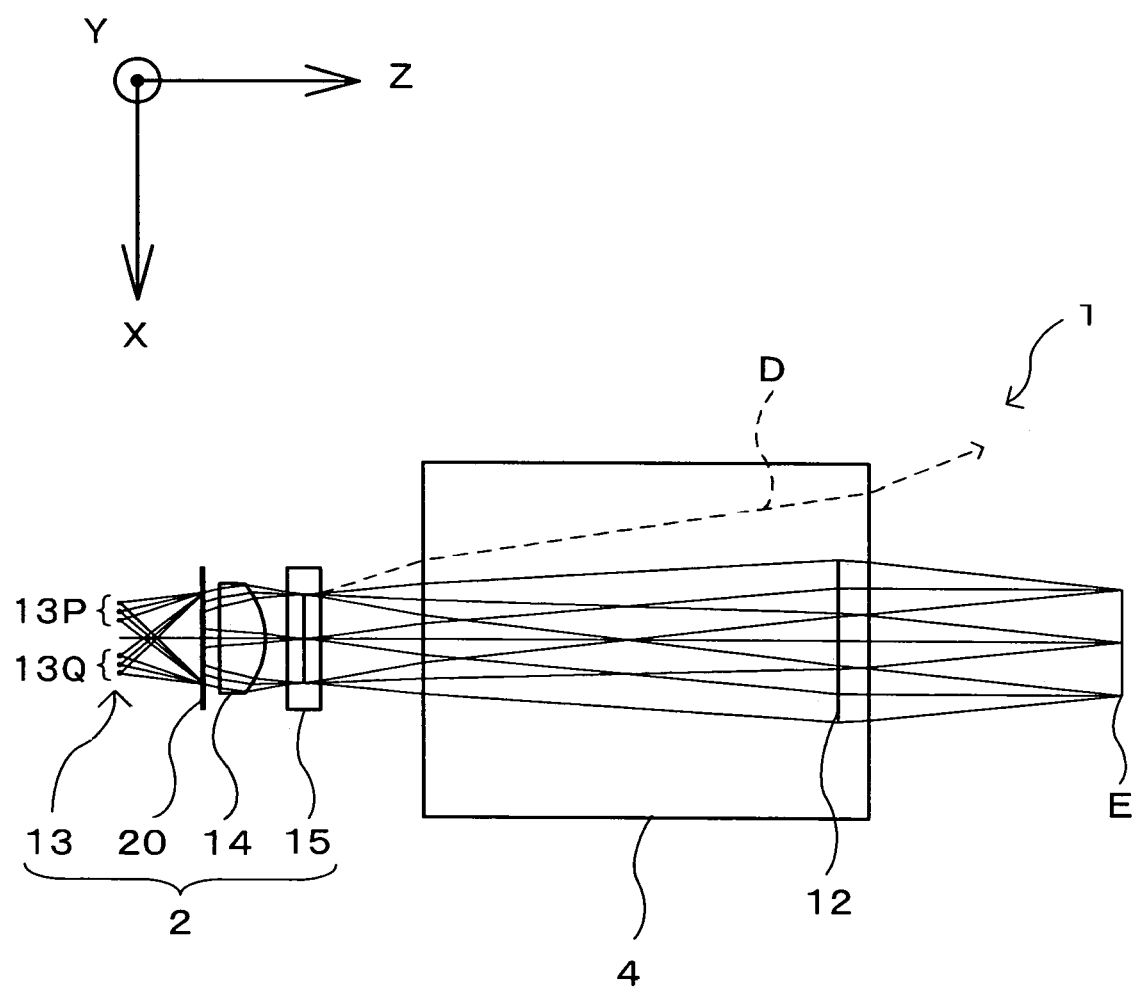
FIG. 19 is an explanatory diagram showing an optical path in the image display device equipped with another light source in the state developed optically in an direction.

FIG. 19 is an explanatory diagram showing an optical path in the image display device 1 equipped with light source 13 including two sets of light emission portions 13R, 13G and 13B in the state developed optically in an direction. For convenience of description, one of two sets of light source 13 is referred to as a light source group 13P, while the other set of light source 13 is referred to as a light source group 13Q.

Figure 20:
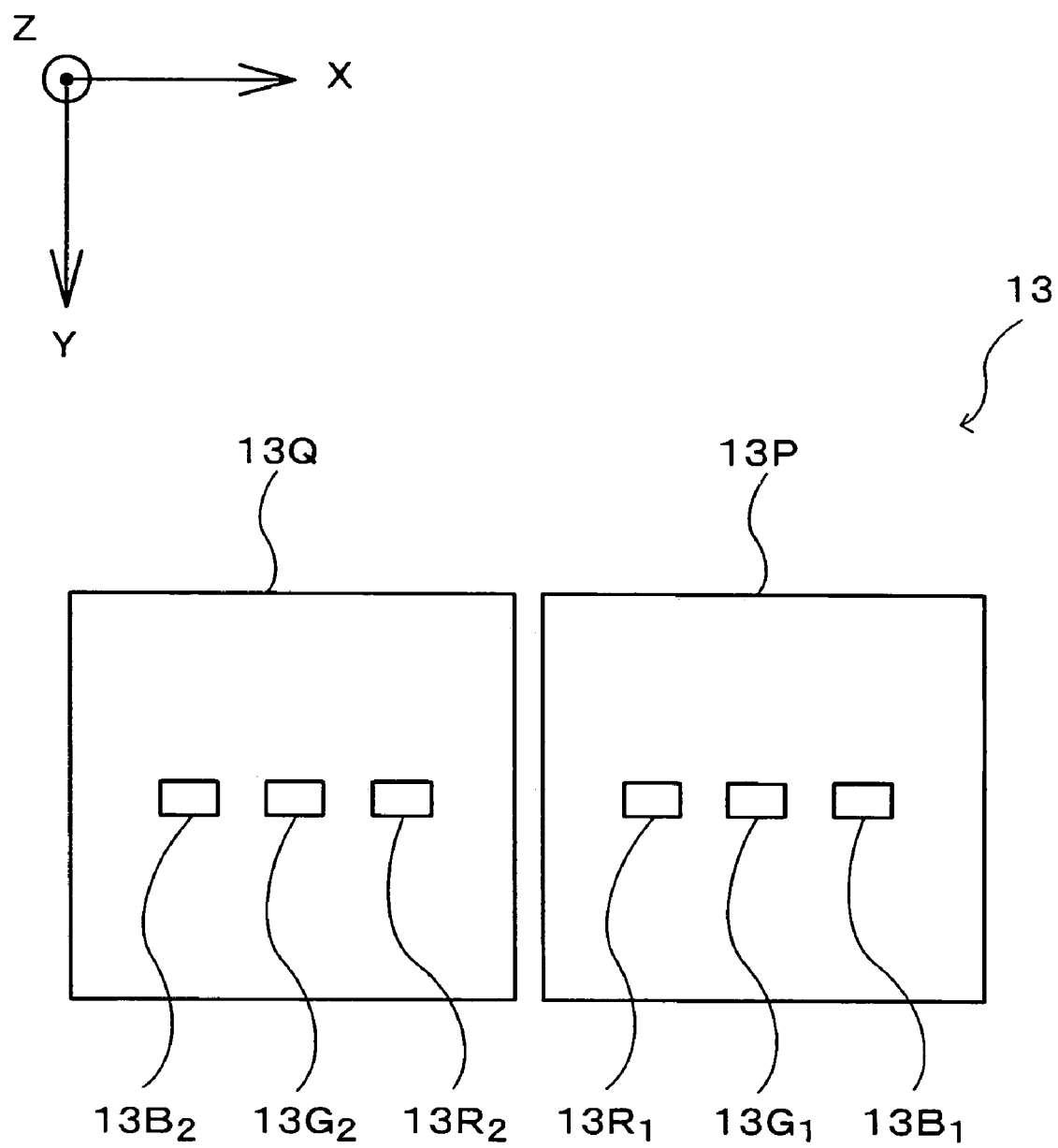
FIG. 20 is a plan view of the light source viewed from the LCD side.

FIG. 20 is a plan view of the light source 13 viewed from the light modulation element 15. The light source group 13P of the light source 13 is made up of an RGB integrated LED including three light emission portions 13R1, 13G1 and 13B1 for emitting light of red, green and blue colors, respectively. In addition, the light source group 13Q is also made up of an RGB integrated LED including three light emission portions 13R2, 13G2 and 13B2 for emitting light of red, green and blue colors, respectively. In this way, the light source 13 has two groups of three light emission portions for emitting light of red, green and blue colors.

The light emission portions of each of the light source groups 13P and 13Q are aligned in the direction perpendicular to the incidence plane of the optical axis to the hologram optical element 12 (YZ plane), and they are arranged so that the light emission portions of each color are symmetric with respect to the incidence plane. More specifically the light emission portions 13R1 and 13R2 are arranged at the symmetric positions with respect to and near to the incidence plane, and on the outer side in the X-direction the light emission portions 13G1 and 13G2 are arranged at the symmetric positions with respect to the incidence plane, and further on the outer side in the X-direction the light emission portions 13B1 and 13B2 are arranged at the symmetric positions with respect to the incidence plane. In other words, the light emission portions are arranged in each of the light source groups 13P and 13Q in such an order that the wavelength of the outgoing light becomes shorter as being farther outward from the incidence plane in the X-direction.

In this way, since the light emission portions are arranged symmetrically for each color with respect to the incidence plane, a barycenter of a total light intensity that is a sum of light intensities of outgoing light beams from two light emission portion of the same color (e.g., 13R1 and 13R2) can be positioned in the plane of symmetry (the incidence plane) for each of red, green and blue colors. In other words, an intensity distribution can be symmetric with respect to the plane of symmetry in the X-direction for each of red, green and blue colors. Thus, it is possible to provide the observer with an image with little color shading at a center of the optical pupil E.

Note that the plane to be the center of symmetry of light emission portions may be the plane parallel to the incidence plane. In other words, the plane to be the center of symmetry of light emission portions may be shifted from the incidence plane slightly in the X-direction. In this case, the observer can be provided with an image with little color shading at a vicinity of the center of the optical pupil E.

If the light source 13 is made up of two light source groups and if the light emission portions are arranged symmetrically with respect to a plane for each color, arrangement orders of the light emission portions in the direction perpendicular to the incidence plane in neighboring groups are opposite to each other. On the other hand, if the number of light source groups constituting the light source 13 is four or larger even number, i.e., if the light source 13 includes four or larger even number of groups of R, G and B light emission portions, a barycenter of a total light intensity that is a sum of light intensities of outgoing light beams from the light emission portions can be positioned in the same plane parallel to the incidence plane (including the incidence plane itself) for each of R, G and B colors by setting the arrangement orders of the light emission portions in neighboring groups opposite to each other in the direction perpendicular to the incidence plane. Thus, the observer can be provided with an image with little color shading at center of the optical pupil E or at a vicinity of the center.

Therefore, the above description can be summarized as follows. The light source 13 has two or larger even number of groups of three (R, G and B) light emission portions, and the observer can be provided with an image with little color shading at center of the optical pupil E or at a vicinity of the center if the arrangement orders of the light emission portions in neighboring groups are opposite to each other in the direction perpendicular to the incidence plane.

In addition, even in the case where the number of the light source groups constituting the light source 13 is four or larger even number, if the light emission portions are arranged symmetrically with reference to the incidence plane, and if the light emission portions that are disposed on both sides of the incidence plane in the vertical direction at positions of the same distance from the incidence plane emit light having the same color, barycenters of light intensities of outgoing light from the light emission portions of each color match on the incidence plane. Therefore, if the number of the light source groups constituting the light source 13 is an even number, the observer can be provided with an image with little color shading at center of the optical pupil by disposing the light emission portions as described above.

In addition, since the light emission portions of the light source groups 13P and 13Q are aligned in the direction (X-direction) perpendicular to the incidence plane (YZ plane) of the optical axis to the hologram optical element 12, the light source 13 is formed to be larger in the X-direction. Therefore, intensity of the peripheral light is high particularly in the X-direction. Accordingly, if the hologram optical element 12 is formed in a size for diffracting only the center beam having good optical performance, it is possible to obtain a high effect of cutting the peripheral light having bad optical performance (the beam shown by the broken line D in FIG. 19) particularly in the X-direction and of relieving a flare or a ghost so that an image with high quality can be provided.

In addition, the hologram optical element 12 is manufactured so as to diffract image light having wavelengths of 465±5 nm, 521±5 nm and 634±5 nm as expressed in full width at half maximum centered around the peak diffraction efficiency wavelength as described above. Since the full width at half maximum of the diffraction efficiency is the same for each color in this way, an angle selectivity is larger as a wavelength of light is larger (i.e., a shift of the incident angle when the wavelength varies is smaller). Therefore, in each of the light source groups 13P and 13Q, since the light emission portions are arranged in the descending order of the wavelength of the outgoing light from the optical axis incidence plane side to the outer side in the X-direction, an intensity difference between colors in the optical pupil E can be reduced so that the observer can be provided with an image with little color shading in the optical pupil E. This will be described in detail as follows.

It is supposed that a wavelength at the diffraction efficiency peak is represented by $\lambda$, an index of refraction of a medium (interference fringes) of the hologram optical element 12 is represented by n, a thickness of the medium is represented by h, and an incident angle is represented by $\theta$. Then, the following relationship is satisfied among them.

$$\lambda = 2nh \cos \theta$$

It is supposed that the same wavelength shift of 5 nm for example occurred in blue color light having short wavelength and red color light having long wavelength. Then, a ratio of variation of the wavelength is 465/470 for the blue color light and 634/639 for the red color light. Therefore, the ratio of variation of the wavelength is smaller for the red color light having long wavelength than for the blue color light having short wavelength. Accordingly, a shift of the incident angle θ when the wavelength varies is smaller (i.e., the angle selectivity is larger) in the red color light having long wavelength than in the blue color light having short wavelength. Thus, if the wavelength widths of the red, green and blue colors of the outgoing light from the light source 13 are the same, a size of the optical pupil due to diffraction by the hologram optical element 12 is smaller as the wavelength becomes longer. Note that the optical pupil E includes all the areas of optical pupils of three colors.

On the other hand, intensity of the outgoing light from the LED (light emission portions) of the light source 13 is usually higher in the center and its vicinity and lower in the periphery. In addition, although each of the light emission portions have substantially a conjugate relationship with the optical pupil in the Y-direction, it does not have an conjugate relationship with the optical pupil in the X-direction since light from it is diffused by the one-way diffuser plate 20. However, the position of the highest intensity in the optical pupil is substantially the same as the position conjugate with each of the light emission portions without the one-way diffuser plate 20.

Therefore, when the center of pupil of the long wavelength (red color) light having a small optical pupil is positioned at the center of the optical pupil E while the center of pupil of the short wavelength (blue color) light having a large optical pupil is positioned at the outside of the center of the optical pupil E, the intensity difference due to the pupil position in the optical pupil E can be decreased for each color. This will be described more in detail as follows.

Figure 21:
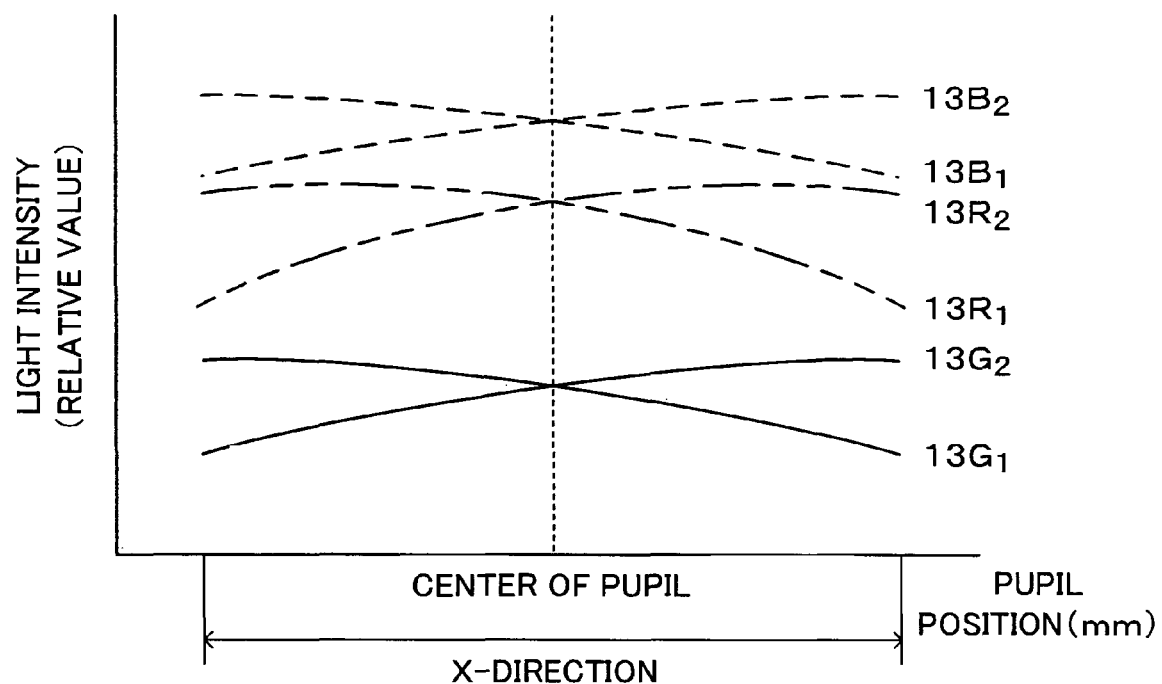
FIG. 21 is a graph showing a relationship between a pupil position in the X-direction and light intensity in the optical pupil.

FIG. 21 is a graph showing a relationship between a pupil position in the X-direction and light intensity in the optical pupil E. Note that the light intensity is indicated in a relative value for the same color. In addition, curves 13R1, 13R2, 13G1, 13G2, 13B1 and 13B2 in FIG. 21 corresponds to light emitted from the light emission portions 13R1, 13R2, 13G1, 13G2, 13B1 and 13B2, respectively.

As described above, according to the angle selectivity of the hologram optical element 12, the optical pupil is smaller as the wavelength is longer. Therefore, as shown in FIG. 21, the longer the wavelength of light is, the larger the intensity difference due to the pupil position (the larger the intensity difference between the center and the periphery in the optical pupil E is). On the contrary, the shorter the wavelength of light is, the larger the optical pupil E is. Therefore, the shorter the wavelength of light is, the smaller the intensity difference due to the pupil position is.

In addition, the light emission portion emitting light of longer wavelength is positioned closer to the optical axis incidence plane side. Therefore, the longer the wavelength of light is, the closer to the center of the optical pupil E the position of high light intensity is. On the contrary, the light emission portion emitting light of shorter wavelength is positioned farther from the optical axis incidence plane. Therefore, the position of high light intensity is on the periphery of the optical pupil E.

Thus, since the intensity difference due to the pupil position is larger for light having a longer wavelength, the light emission portions are arranged in the order such that the wavelength of the outgoing light becomes shorter as going from the optical axis incidence plane side to the outer side in the X-direction, so that the position of high light intensity is positioned closer to the center of the optical pupil E for light having longer wavelength. As a result, the intensity difference due to the pupil position, i.e., the intensity difference between the center and a periphery of the optical pupil E can be decreased for light having a long wavelength. Thus, the observer can be provided with an image with little color shading in the whole area of the optical pupil E (the center and the periphery of the pupil).

In addition, the light emission portions of the light source groups 13P and 13Q may be arranged in the order such that a wavelength of the outgoing light becomes longer as going from the optical axis incidence plane side to the outer side in the X-direction. In this case, since the light emission portions are arranged in the ascending order of the diffusion by the one-way diffuser plate 20 with respect to a wavelength (the longer the wavelength is, the more the diffusion is) in the X-direction, the intensity difference between colors on the optical pupil E becomes small so that the color shading can be reduced. In other words, the observer can be provided with an image with high color purity.

Figure 22:
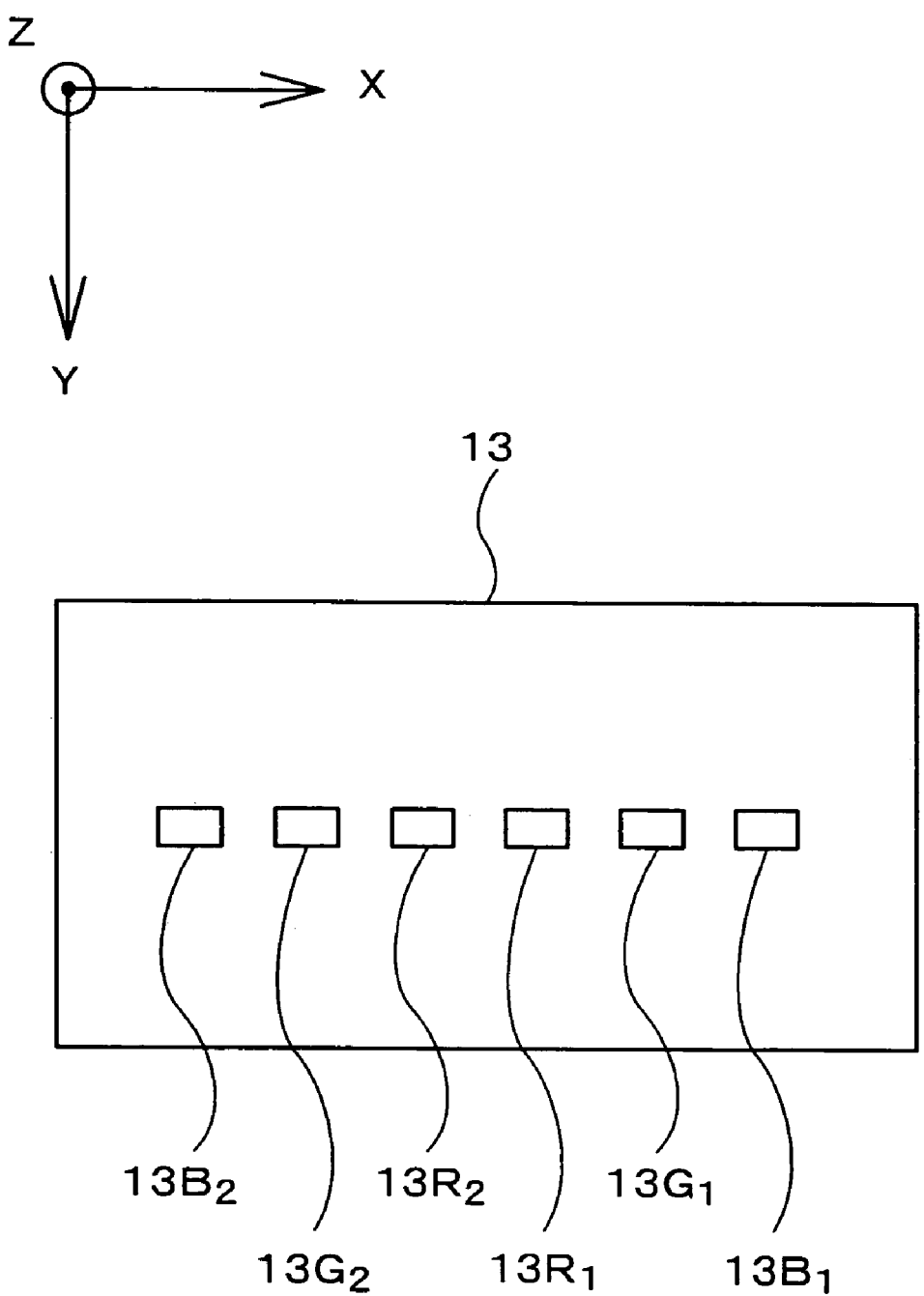
FIG. 22 is a plan view showing another example of the structure of the light source when it is viewed from the LCD side.

Although two groups of R, G and B light emission portions are provided so that the light source 13 includes light source groups 13P and 13Q each of which has a package of each group in the structure described above, each group may be one package. FIG. 22 shows another example of a structure of the light source 13, as a plan view of the light source 13 viewed from the light modulation element 15 side.

In this way, the light source 13 may be structured to be an package of the light emission portions 13R1, 13R2, 13G1, 13G2, 13B1 and 13B2 for emitting light of R G and B colors. In this structure too, the arrangement method of the light emission portions described above can be adopted so that the intensity difference between colors on the optical pupil E as well as the color shading can be reduced. In addition, there is a tendency that the shorter the distance between the light emission portions is, the easier R, G and B colors can be mixed so that a bright image can be provided. From this viewpoint, the structure shown in FIG. 22 is more desirable in which the distance between the light emission portions can be shortened easily.

Fourth Embodiment

Still another embodiment of the present invention will be described below with reference to the drawings. For convenience of description, the same elements as in the structure of the first through the third embodiments are denoted by the same reference numerals, and descriptions thereof will be omitted.

Figure 23:
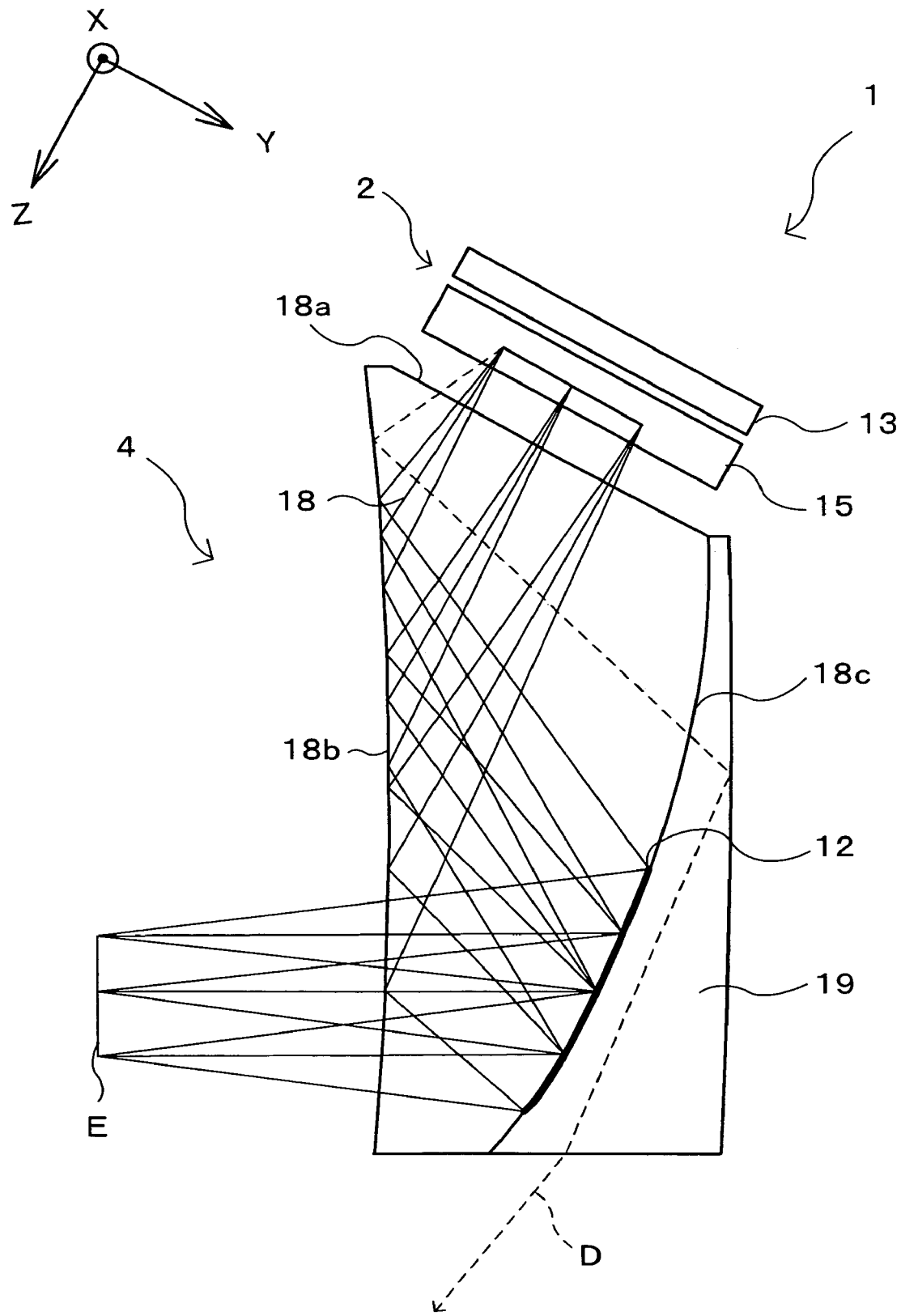
FIG. 23 is a cross section showing a general structure of an image display device according to still another embodiment of the present invention.

FIG. 23 is a cross section showing a general structure of an image display device 1 according to this embodiment. This image display device 1 has the same structure as in the third embodiment except that the condensing lens 14 of the display element 2 is removed, the light source 13 is made up of the white color light source shown in the second embodiment, and the structure of the optical device 4 is modified slightly.

The optical device 4 in this embodiment has a structure in which the hologram optical element 12 is sandwiched between the ocular prism 18 (the substrate and the first transparent substrate) and the deflection prism 19 (the second transparent substrate). The hologram optical element 12 is formed to have a size for diffracting only the center beam of the reproducing light.

The ocular prism 18 and the deflection prism 19 have similar functions as the ocular prism 16 and the deflection prism 17 in the third embodiment. The ocular prism 18 has a first face 18a that is an incidence plane of the image light from the light modulation element 15, a second face 18b that is a selective transmission and reflection plane for passing or reflecting light selectively, and a third face 18c for reflecting light reflected by the second face 18b. Therefore, the ocular prism 18 is different from the ocular prism 16 of the third embodiment in that these three faces are all free surfaces. The hologram optical element 12 described above is formed on the third face 18c.

Further, in this embodiment, the light modulation element 15 has a cylindrical lens array including cylindrical lenses each of which is arranged in each pixel for condensing light only in the Y-direction. According to this structure, the condensing lens 14 becomes needless, and the optical pupil E can be downsized in the Y-direction while it is enlarged in the X-direction.

In the structure described above, light emitted from the light source 13 is modulated by the light modulation element 15 to be the image light that enters the optical device 4. In the optical device 4, the image light enters from the first face 18a of the ocular prism 18 and is reflect totally by the second face 18b so as to enter the third face 18c equipped with the hologram optical element 12. In the third face 18c, image light of a specific wavelength (only the center beam) is reflected by the hologram optical element 12 and goes out to the optical pupil E after passing through the second face 18b. The observer can observe the image as a virtual image when the light enters the pupil at the position of the optical pupil E. In contrast, the peripheral beam of the image light does not enter the hologram optical element 12, so it is not conducted to the optical pupil E.

In this embodiment too, the hologram optical element 12 is formed only in the area for diffracting only the center beam of the reproducing light. Therefore, the observer can observe a high quality image that is formed by the beam (center beam) having high optical performance, and a flare or a ghost due to the peripheral beam (the beam shown by the broken line D in FIG. 23) can be relieved.

Further, in this embodiment, the light source 13 that is the same as in the second embodiment is used. Namely, the light source 13 having the light emission region 13a that is long in the X-direction is used. Therefore, in cooperation with the light modulation element 15 having the cylindrical lens array, the optical pupil E can be enlarged in the X-direction while the optical pupil E can be downsized in the Y-direction. Thus, the observer can observe an image easily, the observer can be provided with a bright image with little loss, an image with high color purity can be displayed, and other effects can be obtained.

In addition, the observer can see an external image with little deterioration via the deflection prism 19 and the ocular prism 18. In addition, since the volume phase type hologram optical element 12 is formed on the third face 18c of the ocular prism 18, its transmittance for the external light increases, so that the external image is bright and more visible. In addition, since the reflection on the second face 18b is a total reflection, transmittance for the external light is not lowered when an external image is observed. Thus, a bright external image can be observed.

Note that each of the three faces of the ocular prism 18 may be a flat plane or a spherical surface. In particular, if the three faces of the ocular prism 18 are curved surfaces, the optical device 4 can have a function of a correcting optical lens.

Fifth Embodiment

Still another embodiment of the present invention will be described below with reference to the drawings. For convenience of description, the same elements as in the structure of the first through the fourth embodiments are denoted by the same reference numerals, and descriptions thereof will be omitted.

In this embodiment, an HMD that uses the image display device 1 of the third embodiment will be described. Note that the image display device 1 described in other embodiments may be used in the HMD of this embodiment.

Figure 24A:
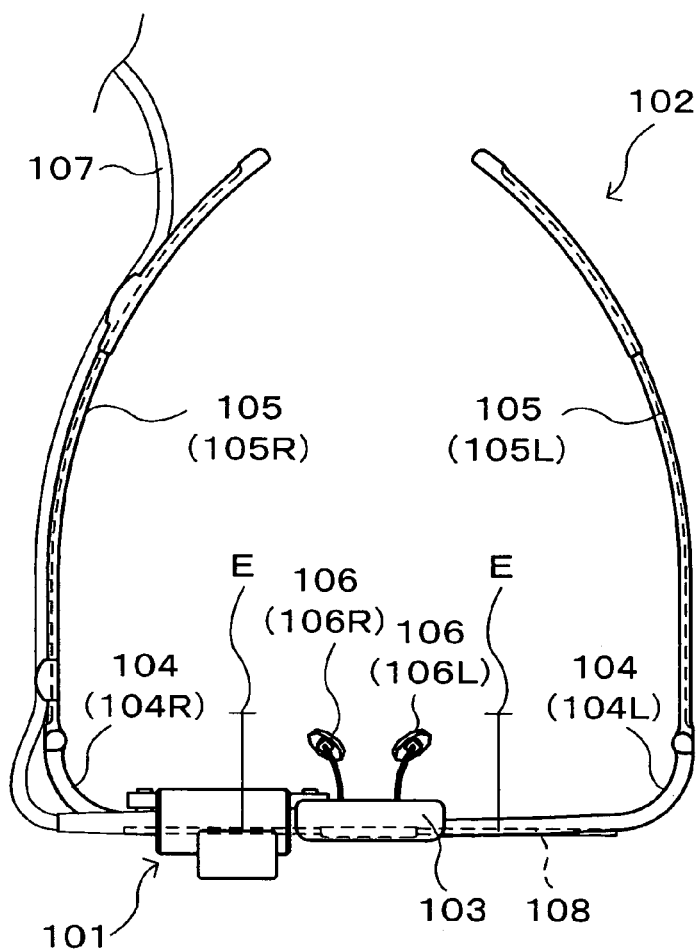
FIG. 24A is a plan view showing a general structure of a head mounted display according to still another embodiment of the present invention.
Figure 24B:
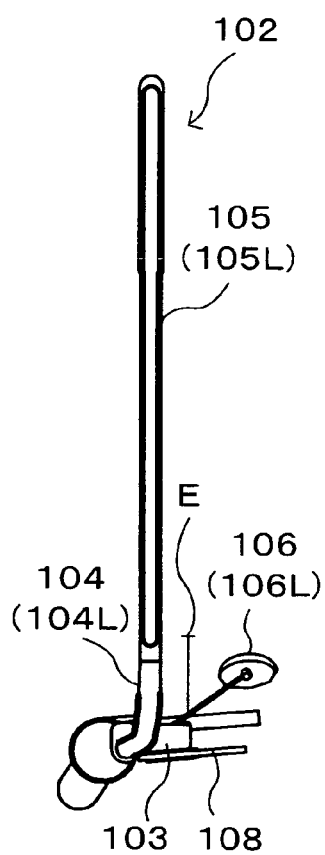
FIG. 24B is a side view of the head mounted display.
Figure 24C:
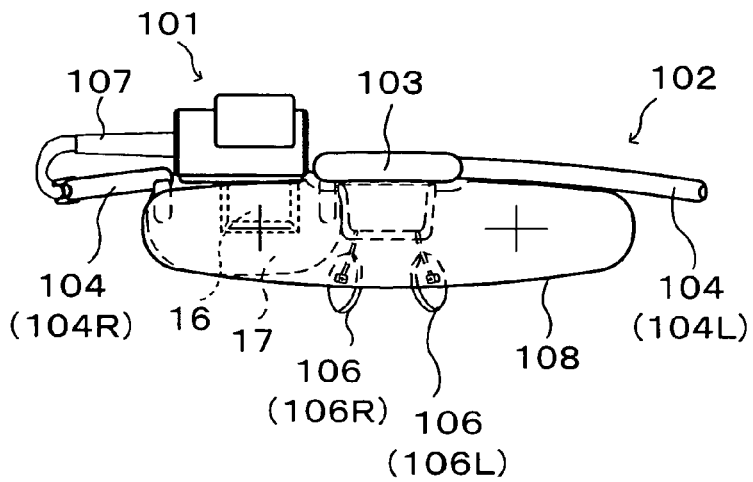
FIG. 24C is a front view of the head mounted display.

FIG. 24A is a plan view showing a general structure of the HMD according to this embodiment, FIG. 24B is a side view of the HMD, and FIG. 24C is a front view of the HMD. The HMD includes the image display device 101 and a support portion 102 for supporting the same. A whole appearance of the HMD is like glasses without one lens (e.g., a lens for the left eye).

The image display device 101 enables the observer to see an external image in a see-through way and display an image for providing the observer with the same as an virtual image. For example, it is made up of the image display device 1 of the third embodiment. Therefore, in the image display device 101 shown in FIG. 24C, the portion corresponding to the lens of glasses for the right eye includes the ocular prism 16 and the deflection prism 17 bonded with each other as shown in FIG. 14.

The support portion 102 is a supporting means for supporting the image display device 101 in front of the eye of the observer (e.g., the right eye). The support portion 102 includes a bridge 103, a frame 104, a temple 105, a nosepiece 106, a cable 107 and an external light transmittance control portion 108. Each of the frame 104, the temple 105 and the nosepiece 106 includes a pair of left and right pieces. When it is necessary to distinguish the right piece from the left piece, they are referred to as a right frame 104R, a left frame 104L, a right temple 105R, a left temple 105L, a right nosepiece 106R and a left nosepiece 106L.

An end of the image display device 101 is supported by the bridge 103. This bridge 103 supports not only the image display device 101 but also the left frame 104L, the nosepiece 106 and the external light transmittance control portion 108. The left frame 104L supports the left temple 105L in a rotatable manner. On the other hand, the other end of the image display device 101 is supported by the right frame 104R. The opposite end of the right frame 104R to the end supporting the image display device 101 supports the right temple 105R in a rotatable manner.

The cable 107 includes electric wires for supplying external signals (e.g., an image signal and a control signal) and electric power to the image display device 101, and it is laid along the right frame 104R and the right temple 105R. The external light transmittance control portion 108 provided to the bridge 103 controls transmittance of the external light (light of the external image), and it is disposed at the front side of the image display device 101 (the opposite side to the observer).

When the observer uses the HMD, the right temple 105R and the left temple 105L are put on the right side and the left side of the observer's head, and the nosepiece 106 are put on the observer's nose so that the HMD is attached to the observer's head like usual glasses. When the image display device 101 displays an image in this state, the observer can observe the image on the image display device 101 as a virtual image as well as an external image through this image display device 101 in a see-through manner.

If the external light transmittance is set to a low value less than 50% for example by the external light transmittance control portion 108, the observer can observe the image on the image display device 101 easily. On the contrary, if the external light transmittance is set to a high value more than 50% for example, the observer can observe the external image easily. Therefore, the external light transmittance may be set to an appropriate value by the external light transmittance control portion 108 for easy observation of the image on the image display device 101 and the external image.

In this way, according to the structure of the HMD of this embodiment, the image display device 101 is supported by the support portion 102, so the observer can observe an image provided by the image display device 101 in a hands-free manner.

Note that the HMD may not limited to have only one image display device 101. For example, FIG. 25A is a plan view showing another structure of the HMD, FIG. 25B is a side view of the HMD, and FIG. 25C is a front view of the HMD. In this way, the HMD may have two image display devices 101 disposed in front of both eyes of the observer. In this case, the image display device 101 disposed in front of the left eye is supported by the bridge 103 and the left frame 104L between them. In addition, the cable 107 is connected to both the image display devices 101 so that external signals and the like are supplied to both the image display device 101 via the cable 107. Using the HMD structured as described above, the observer can observe an image provided from each of the image display devices 101 by each eye in a hands-free manner.

The image display device 1 described in the first through the fourth embodiments can be used not only for the HMD of this embodiment but also other devices such as a head up display, for example. In addition, it is also possible to combine the structures of the embodiments appropriately so as to constitute the image display device 1 or the HMD.

Note that the present invention can be expressed as follows.

The optical device of the present invention is an optical device made up of a volume phase type hologram optical element formed on the substrate, and the hologram optical element is formed in the area that is smaller than the irradiation area of a beam that is irradiated for reproduction on the substrate.

According to the structure described above, the hologram optical element is formed on the substrate in the area smaller than the irradiation area of the reproducing light. The reproducing light is image light emitted from the display element when the optical device of the present invention is used for an image display device, for example. Alternatively, it is light from an imaging target (an object) when the optical device of the present invention is used for an imaging device.

In this structure, when the reproducing light irradiates the hologram optical element, it is possible for example that the peripheral beam of the reproducing light having intensity lower than 50% of the center intensity is not diffracted by the hologram optical element, and only a remaining center beam (a beam inside the peripheral beam having intensity hither than 50% of the center intensity) is diffracted by the hologram optical element. In general, the center beam has little aberration and has a high optical performance. Therefore, if the optical device of the present invention is used for the image display device for example, the observer can observe a high quality image formed by the beam having a high optical performance. On the other hand, if the optical device of the present invention is used for an imaging device, the imaging sensor (e.g., a CCD) can obtain a high quality image of an object formed by the beam having a high optical performance.

Further, in the present invention, the forming area of the hologram optical element is controlled so that undesired light is not conducted to the observer's pupil (i.e., is not diffracted by the hologram optical element). Thus, it is not necessary to dispose a shading plate in front of the observer's eye unlike the conventional structure. Thus, even in the case where the optical device of the present invention is used for the ocular optical system of the image display device (as a combiner between the image light and the external light), a wide field of view for the observer to observe an external image can be secured. In addition, since a shading plate is unnecessary unlike the conventional structure, the image display device can be downsized (can have a low profile particularly), and cost reduction thereof can be realized.

In addition, if the beam that irradiates the substrate for reproduction is made up of a center beam having intensity higher than 50% of the center intensity and other peripheral beam, it is desirable that the hologram optical element is formed in a size for diffracting only the center beam. In this case, it is possible to use only the beam having high optical performance so that an image observed by the observer or an object image obtained by the imaging sensor securely has a high image quality. In addition, since more than 50% of the center intensity is secured as a light intensity of the center beam, brightness of the image or the object image formed by using the center beam will not decrease substantially.

In addition, the hologram optical element is manufactured by irradiating the hologram photosensitive material applied on the substrate with two beams so that interference fringes are recorded on the hologram photosensitive material. The hologram photosensitive material may be applied only in the overlapping part of the irradiation areas of the two beams on the substrate.

If the hologram photosensitive material is applied on the substrate only in the overlapping part of the irradiation areas of the two beams for manufacture, the hologram optical element can be formed only in a required area on the substrate regardless of the irradiation areas (or the beam diameters) of the two beams on the substrate. Therefore, it is not necessary to adjust the irradiation areas (or the beam diameters) of the two beams to each other or to adjust them to the forming area of the hologram optical element.

In addition, the hologram optical element may be manufactured by irradiating a part of the hologram photosensitive material applied on the substrate with two beams in such a manner that the irradiation areas overlap on the part, so that interference fringes are recorded on the overlapping part of the irradiation areas of the two beams on the hologram photosensitive material.

In this case too, the hologram optical element can be formed only in a required area within the area where the hologram photosensitive material is applied on the substrate. In this case, the irradiation areas of the two beams on the substrate may be the same. Otherwise, one of the irradiation areas may be includes in the other irradiation area.

However, in the latter case where the two beams irradiate the hologram photosensitive material so that one irradiation area is included in the other irradiation area on the hologram photosensitive material, it is desirable that the part of the hologram photosensitive material except for the overlapping part of the irradiation areas of the two beams is removed. In this case, deterioration of quality of the observed image can be avoided by preventing the part of the hologram photosensitive material that is formed by irradiation of one of the beams from diffracting light to reach the observer's pupil as a flare light or a ghost light.

In addition, it is desirable that each of the two beams is formed by restricting an angle of divergence of light emitted from the corresponding point light source by using a diaphragm. In this case, the irradiation areas of the two beams on the substrate can be controlled easily and securely at a low cost. Therefore, a size (a forming area) of the hologram optical element on the substrate can be controlled easily and securely at a low cost.

In addition, it is desirable that the hologram optical element has a (positive or negative) optical power that is axially asymmetric. If this hologram optical element is used for constituting an image display device or an imaging device, arrangement flexibility of optical elements that constitute the device can be enhanced, so that the devices can be downsized easily.

The image display device of the present invention includes a display element for displaying an image, and an ocular optical system for conducting image light from the display element to the observer's pupil. The ocular optical system includes the optical device of the present invention described above.

According to the structure described above, the image light from the display element is conducted to the observer's pupil via the ocular optical system including the optical device of the present invention. In this case, since the hologram optical element of the optical device is formed in the area smaller than the irradiation area of the beam for reproduction (i.e., the image light) on the substrate, it is possible to diffract only the center beam having high optical performance with little aberration of the reproducing light by the hologram optical element without diffracting the peripheral beam having bad optical performance with much aberration by the hologram optical element. Thus, the observer can observe a high quality image formed by the beam having high optical performance.

Moreover, the forming area (area) of the hologram optical element is restricted so that undesired light (the peripheral beam having bad optical performance) is not conducted to the observer's pupil (i.e., not diffracted by the hologram optical element). Therefore, it is different from the conventional structure in which a shading plate is disposed in front of the observer eye. Accordingly, even in the case where the ocular optical system is used as a combiner between the image light and the external light, a wide field of view for the observer to observe an external image can be secured. In addition, since the conventional shading plate is needless, downsizing (particularly a low profile) and cost reduction of the device can be realized.

In addition, it is desirable that the hologram optical element of the optical device is formed to be larger in the direction perpendicular to the incidence plane of the optical axis to the hologram optical element than in the direction parallel to the incidence plane. Note that the incidence plane of the optical axis to the hologram optical element means a plane including the optical axis of the incident light and the optical axis of reflected light in the hologram optical element.

If the hologram optical element is axially asymmetric, wavelength characteristic (wavelength selectivity) of the hologram optical element is large in the direction parallel to the incidence plane of the optical axis to the hologram optical element. As a result, if the incident angle of the incident light is shifted, the diffraction wavelength is easily shifted. Therefore, the hologram optical element is formed to be larger in the direction perpendicular to the incidence plane. More specifically, the hologram optical element is formed to be larger in the direction of small wavelength characteristic, so that the optical pupil becomes larger in the direction perpendicular to the incidence plane. Thus, the optical pupil can be large in the direction of small wavelength characteristic, so that the observer can be provided with an image with little color shading that can be observed easily. In addition, since a size of the optical pupil becomes relatively smaller in the direction parallel to the incidence plane than in the direction perpendicular to the incidence plane, the image light can be condensed with little loss so that the observer can be provided with a bright image.

Moreover, in the image display device of the present invention, the display element includes the light source for emitting light and the light modulation element for modulating the light from the light source so as to display and image. The light source may be formed to be larger in the direction perpendicular to the incidence plane of the optical axis to the hologram optical element than in the direction parallel to the incidence plane.

Note that the light source may be one that has at least one set of three light emission portions emitting light corresponding to three primary colors or may be a white color light source emitting white color light by exciting a fluorescent material by blue color light or ultraviolet light, for example. In the former case, the light emission portions may be aligned in the direction perpendicular to the incidence plane. In the latter case, the white color light source may have a structure for emitting a white color light as a slit-like beam having a longitudinal direction that is perpendicular to the incidence plane of the optical axis to the hologram optical element.

As described above, the direction perpendicular to the incidence plane is the direction of small wavelength characteristic in the hologram optical element. Therefore, if the light source is formed to be larger in the direction perpendicular to the incidence plane of the optical axis to the hologram optical element than the direction parallel to the incidence plane, the observer can be provided with a high quality image with little color shading.

In addition, it is desirable that the hologram optical element is a combiner for conducting image light from the display element and external light simultaneously to the observer's pupil. In this case, the observer can observe the image provided from the display element and the external image simultaneously through the hologram optical element.

In addition, the substrate on which the hologram optical element is formed may have a structure for conducting the image light from the display element to the observer's pupil via the hologram optical element by means of total internal reflection while passing and conducting the external light to the observer's pupil. When this substrate is used, the image from the display element can be observed while a bright external image can be observed since transmittance for the external light is increased.

In addition, when the above-mentioned substrate is a first transparent substrate, it is desirable that the ocular optical system is equipped with a second transparent substrate for canceling the refraction of the external light in the first transparent substrate. In this case, it is prevented a distortion from appearing in the external image observed by the observer through the ocular optical system.

As understood clearly from the above description, the present invention can be modified or transformed variously. Therefore, it should be understood that the present invention is not limited to the above specific description but can be embodied variously within the scope of the attached claims.

What is claimed is:

1. An image display device, comprising:
   a display element for displaying an image; and
   an ocular optical system for conducting image light from the display element to an observer's pupil, wherein
   the ocular optical system includes, along a single optical path from the display element to the observer's pupil,
   a substrate having a first surface, a normal of the first surface being inclined relative to an optical axis of the image display device, and a volume phase type hologram optical element formed on the first surface of the substrate for diffracting and reflecting incident light, wherein:

the hologram optical element is formed in an area that is smaller than an irradiation area on the first surface of the substrate that, in operation, is irradiated with light, the hologram optical element is larger in a first direction along the first surface of the substrate than in a second direction along the first surface of the substrate, and the first direction is a direction perpendicular to a plane that includes the optical axis of light incident on the hologram optical element and the optical axis of light reflected from the hologram optical element, and the second direction is a direction perpendicular to the first direction.

2. The image display device according to claim 1, wherein the display element includes a light source for emitting light and a light modulation element for modulating the light from the light source so as to display an image, and the light source is formed to be larger in the first direction along the first surface of the substrate than in the second direction along the first surface of the substrate.

3. The image display device according to claim 1, wherein the hologram optical element is a combiner for conducting the image light from the display element and external light simultaneously to the observer's pupil.

4. The image display device according to claim 1, wherein the substrate on which the hologram optical element is formed is configured to conduct the image light from the display element to the observer's pupil through the hologram optical element by means of total internal reflection while it passes and conducts external light to the observer's pupil.

5. The image display device according to claim 4, wherein the substrate is a first transparent substrate, and the ocular optical system is equipped with a second transparent substrate for canceling refraction of the external light in the first transparent substrate.

6. A head mounted display comprising:

an image display device; and a support portion for supporting the image display device in front of an observer's eye, wherein the image display device includes a display element for displaying an image and an ocular optical system for conducting image light from the display element to an observer's pupil, and the ocular optical system includes, along a single optical path from the display element to the observer's pupil, a substrate having a first surface, a normal of the first surface being inclined relative to an optical axis of the image display device, and a volume phase type hologram optical element formed on the first surface of the substrate for diffracting and reflecting incident light, the hologram optical element is formed in an area that is smaller than an irradiation area on the first surface of the substrate that, in operation, is irradiated with light and is larger in a first direction along the first surface of the substrate than in a second direction along the first surface of the substrate, and the first direction is a direction perpendicular to a plane that includes the optical axis of light incident on the hologram optical element and the optical axis of light reflected from the hologram optical element, and the second direction is a direction perpendicular to the first direction.

7. An image display device comprising:

a display element for displaying an image;

a substrate having a first surface, a normal of the first surface being inclined relative to an optical axis of the image display device and including an irradiation area for receiving image light from the display element; and a volume phase type hologram optical element for diffracting and reflecting image light, wherein the hologram optical element is positioned so as to be on a single optical path from the display element to a position of an observer's pupil and is formed on a portion of the irradiation area, the portion being smaller than the irradiation area, wherein the hologram optical element is larger in a first direction along the first surface of the substrate than in the second direction along the first surface of the substrate, wherein the first direction is a direction perpendicular to a plane that includes the optical axis of light incident on the hologram optical element and the optical axis of light reflected from the hologram optical element, and the second direction is a direction perpendicular to the first direction, and wherein, an area external to the portion of the irradiation area on which the hologram optical element is formed is not configured to diffract light.

8. The image display device according to claim 7, wherein the image light comprises a center portion and a peripheral portion, the peripheral portion having an intensity less than 50% of a center intensity of the center portion, and the hologram optical element being formed in a size for diffracting only the center portion.

9. The image display device according to claim 7, wherein the display element includes a light source for emitting light and a light modulation element for modulating the light from the light source to display the image, the light source being formed larger in the first direction along the first surface of the substrate than in the second direction along the first surface of the substrate.

10. The image display device according to claim 7, wherein the hologram optical element is a combiner for simultaneously conducting external light and the image light from the display element to the observer's pupil.

11. An image projection display device for projecting an image to a screen and forming a real image on the screen comprising:

a display device for displaying an image;

a projection lens for projecting the image, wherein the projection lens is positioned on a single optical path from the display device to an intended position of a screen; and an optical device positioned on the single optical path, the optical device comprising:

a substrate having a first surface; and a volume phase type hologram optical element formed on the first surface of the substrate for diffracting and reflecting incident light, and wherein the hologram optical element is smaller than an irradiation area on the first surface of the substrate;

wherein a normal of the first surface on which the hologram optical element is formed is inclined to an optical axis of the image projection display device; and the hologram optical element is larger in a first direction along the first surface of the substrate than in a second direction along the first surface of the substrate, and the first direction is a direction perpendicular to a plane that includes the optical axis of light incident on the hologram optical element and the optical axis of light reflected from the hologram optical element, and the second direction is a direction perpendicular to the first direction.

* * * * *